(12) United States Patent
Omata et al.

(10) Patent No.: US 11,711,045 B2
(45) Date of Patent: Jul. 25, 2023

(54) ELECTRIC MOTOR DRIVE DEVICE

(71) Applicant: DENSO CORPORATION, Kariya (JP)

(72) Inventors: Ryuji Omata, Kariya (JP); Michitsune Fujii, Kariya (JP); Daigo Nobe, Toyota (JP); Makoto Nakamura, Okazaki (JP)

(73) Assignee: DENSO CORPORATION, Kariya (JP)

( * ) Notice: Subject to any disclaimer, the term of this patent is extended or adjusted under 35 U.S.C. 154(b) by 139 days.

(21) Appl. No.: 17/406,215

(22) Filed: Aug. 19, 2021

(65) Prior Publication Data

US 2021/0384863 A1 Dec. 9, 2021

Related U.S. Application Data

(63) Continuation of application No. PCT/JP2020/005863, filed on Feb. 14, 2020.

(30) Foreign Application Priority Data

Feb. 19, 2019 (JP) .................................. 2019-027470
Feb. 6, 2020 (JP) .................................. 2020-018720

(51) Int. Cl.
| | | |
|---|---|---|
| H02P 1/32 | (2006.01) | |
| H02P 3/20 | (2006.01) | |
| H02P 7/06 | (2006.01) | |
| H02P 29/028 | (2016.01) | |
| H02P 25/22 | (2006.01) | |
| H02P 27/08 | (2006.01) | |

(52) U.S. Cl.
CPC ............ *H02P 29/028* (2013.01); *H02P 25/22* (2013.01); *H02P 27/08* (2013.01)

(58) Field of Classification Search
CPC ......... H02P 29/028; H02P 25/22; H02P 27/08
USPC ......................................................... 318/496
See application file for complete search history.

(56) References Cited

U.S. PATENT DOCUMENTS 5,414,339 A * 5/1995 Masaki ................... B60L 50/51
363/56.02
8,102,142 B2 1/2012 Smith et al.
(Continued)

FOREIGN PATENT DOCUMENTS

| JP | 2009-273348 A | 11/2009 |
| JP | 2015-139340 A | 7/2015 |

(Continued)

*Primary Examiner* — Erick D Glass
(74) *Attorney, Agent, or Firm* — Oliff PLC

(57) ABSTRACT

An electric motor drive device controls driving of a motor having open windings of two or more phases having end points that are open to each other. The switching arbitrator determines switching between a single-sided and dual-sided drive mode and arbitrates output of each of the inverters at a time of switching wherein output of the motor is continuous before and after the drive mode switching. The single-sided drive mode is a mode in which one of the two inverters performs switching drive. The dual-sided drive mode in which both the two inverters perform switching drive. The switching arbitrator gradually changes and increases the power level of the drive-start-side inverter from zero when the single-sided drive mode is switched to the dual-sided drive mode, and gradually changes and decreases the power level of the drive-end-side inverter to zero when the dual-sided drive mode is switched to the single-sided drive mode.

17 Claims, 31 Drawing Sheets

(56) References Cited

U.S. PATENT DOCUMENTS

| | | | | |
|---|---|---|---|---|
| 10,829,147 | B2* | 11/2020 | Ohashi | H02P 29/0241 |
| 11,018,614 | B2* | 5/2021 | Omata | H02P 27/08 |
| 2018/0375457 | A1* | 12/2018 | Kitamura | B62D 5/0463 |
| 2020/0198697 | A1* | 6/2020 | Nabeshi | H02M 7/53871 |

FOREIGN PATENT DOCUMENTS

| | | |
|---|---|---|
| JP | 2016-220392 A | 12/2016 |
| JP | 2017-163733 A | 9/2017 |
| JP | 2017-175747 A | 9/2017 |
| JP | 2017-204902 A | 11/2017 |

\* cited by examiner

<DUAL-SIDED DRIVE>

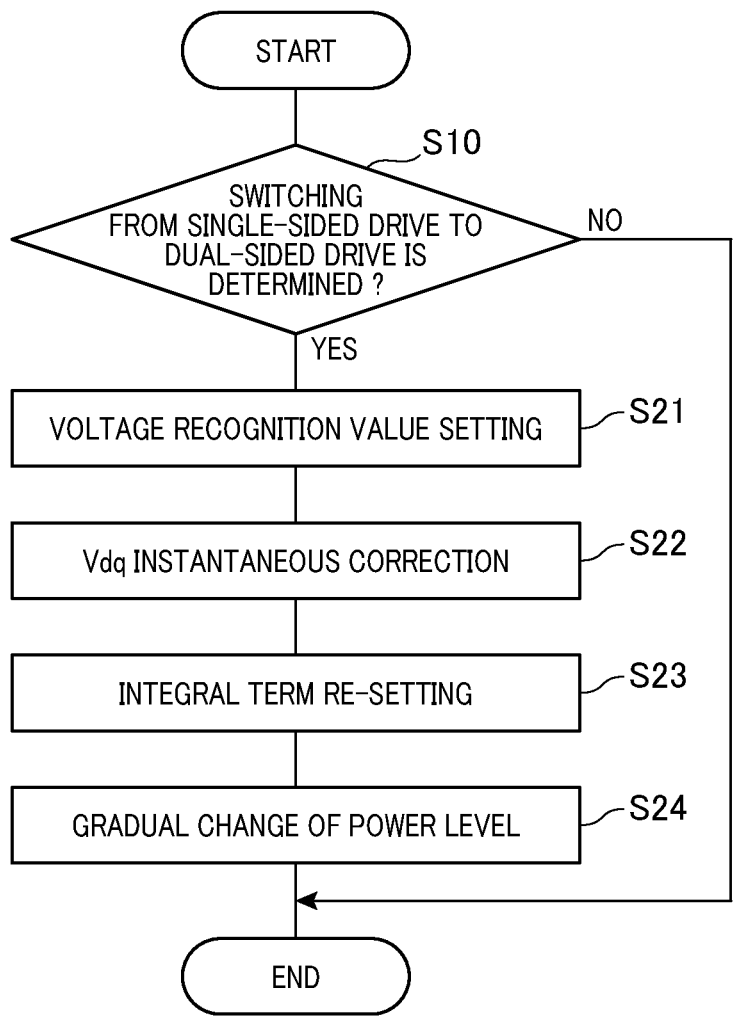

FIG.15A

FIRST INV SINGLE-SIDED DRIVE TO DUAL-SIDED DRIVE

INSTANTANEOUS CORRECTION OF POWER SOURCE VOLTAGE RECOGNITION VALUE $\times \dfrac{\text{AFTER SWITCHING}:VH1+VH2}{\text{BEFORE SWITCHING}:VH1}$ $= 1 + \alpha$ $(\alpha = VH2/VH1)$

DUAL-SIDED DRIVE TO SECOND INV SINGLE-SIDED DRIVE

INSTANTANEOUS CORRECTION OF POWER SOURCE VOLTAGE RECOGNITION VALUE $\times \dfrac{\text{AFTER SWITCHING}:VH2}{\text{BEFORE SWITCHING}:VH1+VH2}$ $= \dfrac{\alpha}{1+\alpha}$

POWER DISTRIBUTION CONTROL (GRADUAL CHANGE)

| FIRST INV SINGLE-SIDE (FB) | OUTPUT ARBITRATION | SECOND INV SINGLE-SIDE (FB) |
|---|---|---|
| Vdq1 = MG OUTPUT<br>Vdq2 = 0 | . . . | Vdq1 = 0<br>Vdq2 = MG OUTPUT |

DIFFERENCE BETWEEN VOLTAGES OF TWO POWER SOURCES ($\alpha > 1$)

⟨SINGLE-SIDED DRIVE: STAR CONNECTION CIRCUIT⟩

<DUAL-SIDED DRIVE: H-BRIDGE CIRCUIT>

FOURTH EMBODIMENT

ELECTRIC MOTOR DRIVE DEVICE

CROSS-REFERENCE TO RELATED APPLICATION

This application is the U.S. bypass application of International Application No. PCT/JP2020/005863 filed on Feb. 14, 2020 which designated the U.S. and claims priority to Japanese Patent Application No. 2019-027470, filed on Feb. 19, 2019, and Japanese Patent Application No. 2020-018720, filed on Feb. 6, 2020, the contents of all of which are incorporated herein by reference.

TECHNICAL FIELD

The present disclosure relates to an electric motor drive device.

BACKGROUND

Conventionally, there has been known a technique for driving a single AC motor provided between two inverters. For example, the inverter system disclosed in U.S. Pat. No. 8,102,142B2 uses a combination of two power sources of different types (for example, an output type power source and a capacitive type power source), and drives a motor with the more suitable power source depending on the operating temperature range. The system takes into consideration the state and characteristics of each power source and switches between one-side power drive and two-side power drive to compensate for an instantaneous drop in the output of the motor.

SUMMARY

An electric motor drive device according to a first aspect of the disclosure controls the driving of a motor including two or more phases of open windings of which end points are open to each other, using two inverters individually connected to two power sources. Such an electric motor drive device includes a first inverter, a second inverter, and a control unit.

The first inverter receives DC power from a first power source, includes a plurality of first switching elements so disposed as to correspond to the phases of the open windings, and is connected to one ends of the open windings. The second inverter receives DC power from a second power source, includes a plurality of second switching elements so disposed as to correspond to the phases of the open windings, and is connected to the other ends of the open windings.

The control unit includes two inverter control circuits of a first inverter control circuit that generates a first voltage and a second inverter control circuit that generates a second voltage command, based on a torque command, and a switching arbitrator. The first voltage command is an output voltage command to the first inverter. The second voltage command is an output voltage command to the second inverter. The switching arbitrator determines the switching between a single-sided drive mode and a dual-sided drive mode and arbitrates output of each of the inverters at a time of switching so that output of the motor is continuous before and after the drive mode switching. The single-sided drive mode is a mode in which one of the two inverters performs switching drive. The dual-sided drive mode is a mode in which both the two inverters perform switching drive.

At least one of the inverter control circuits has a function of adjusting the level of the power supplied from the two power sources to the two inverters. The switching arbitrator gradually changes and increases the power level of the drive-start-side inverter from zero when the single-sided drive mode is switched to the dual-sided drive mode. When the dual-sided drive mode is switched to the single-sided drive mode, the switching arbitrator gradually changes and decreases the level of power of the drive-end-side inverter to zero.

BRIEF DESCRIPTION OF THE DRAWINGS

The above features of the present disclosure will be made clearer by the following detailed description, given referring to the appended drawings. In the accompanying drawings:

FIG. 6 is a flowchart of a drive mode switching process according to the first embodiment;

FIG. 15A is a control block diagram for executing a drive mode switching process according to a third embodiment;

DETAILED DESCRIPTION OF THE PREFERRED EMBODIMENTS

Figure 1:
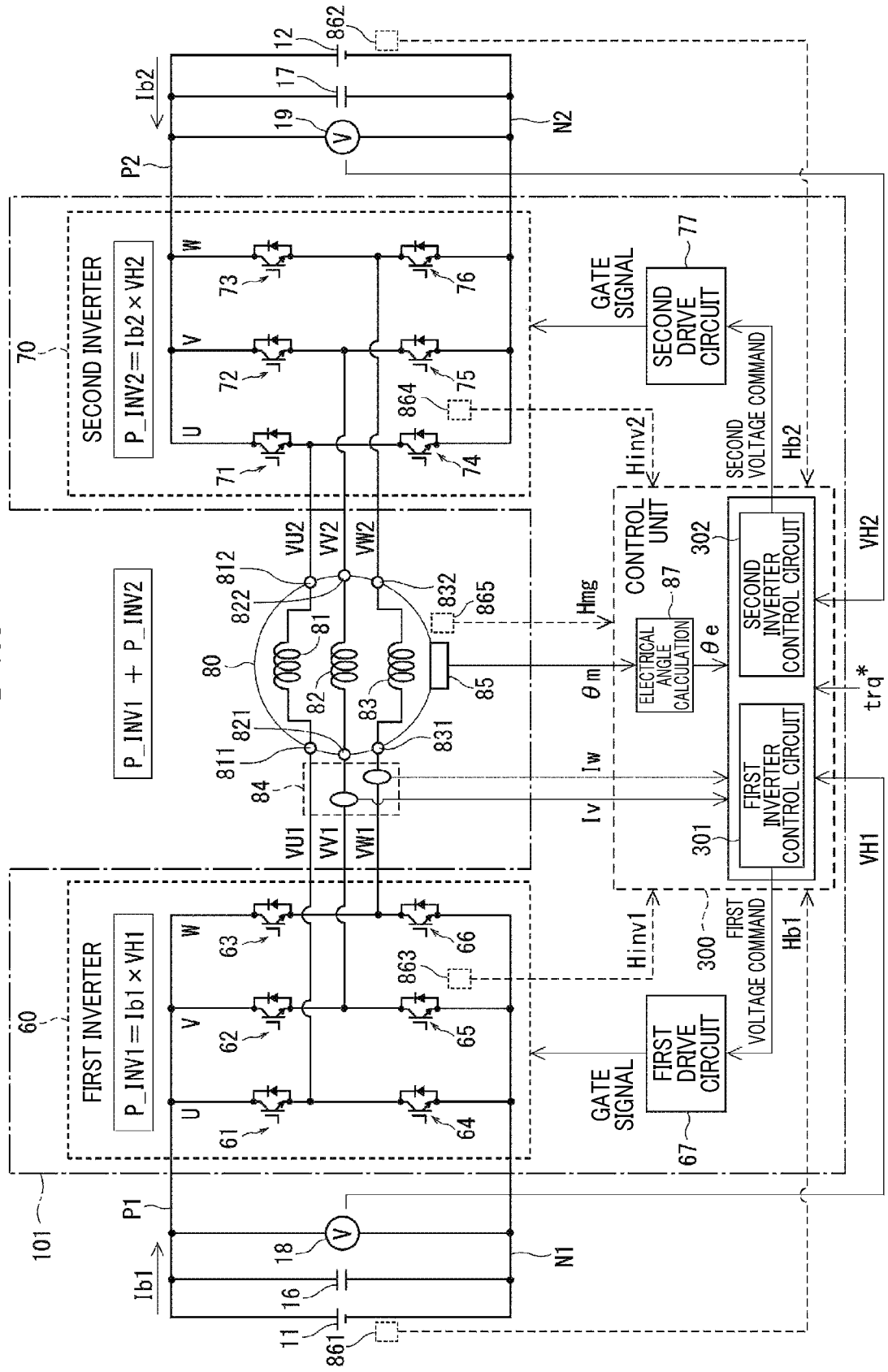
FIG. 1 is a diagram of the overall configuration of a system to which an electric motor drive device of the first embodiment is applied.

U.S. Pat. No. 8,102,142B2 describes the switching of a drive pattern using one or both of two power sources having different characteristics based on the driving state of the apparatus and the output of the motor. However, as an unavoidable problem of a two-power source, two-inverter system, the voltage across the two ends of the motor coil always suddenly changes when the drive mode is switched. U.S. Pat. No. 8,102,142B2 does not mention a specific switching method that could address this problem.

The two inverters each independently output voltage pulses, and the voltage to be applied to the motor coil is determined by the voltage pulses. In other words, unless each inverter output is controlled to an optimum value required by the motor at that point in time, torque fluctuation occurs because of current disturbance caused by excessive or insufficient voltage. In the worst case, overcurrent generated by excessive voltage application may cause component failure. This problem applies not only to a two-power source, two-inverter system, but also to a system in which two inverters are connected to one common power source.

An object of the disclosure is to provide an electric motor drive device having a two-inverter configuration that stabilizes and maintain continuity of motor output at the time of switching between a single-sided drive mode and a dual-sided drive mode.

An electric motor drive device according to a first aspect of the disclosure controls the driving of a motor including two or more phases of open windings of which end points are open to each other, using two inverters individually connected to two power sources. Such an electric motor drive device includes a first inverter, a second inverter, and a control unit.

The first inverter receives DC power from a first power source, includes a plurality of first switching elements so disposed as to correspond to the phases of the open windings, and is connected to one ends of the open windings. The second inverter receives DC power from a second power source, includes a plurality of second switching elements so disposed as to correspond to the phases of the open windings, and is connected to the other ends of the open windings.

The control unit includes two inverter control circuits of a first inverter control circuit that generates a first voltage and a second inverter control circuit that generates a second voltage command, based on a torque command, and a switching arbitrator. The first voltage command is an output voltage command to the first inverter. The second voltage command is an output voltage command to the second inverter. The switching arbitrator determines the switching between a single-sided drive mode and a dual-sided drive mode and arbitrates output of each of the inverters at a time of switching so that output of the motor is continuous before and after the drive mode switching. The single-sided drive mode is a mode in which one of the two inverters performs switching drive. The dual-sided drive mode is a mode in which both the two inverters perform switching drive.

At least one of the inverter control circuits has a function of adjusting the level of the power supplied from the two power sources to the two inverters. The switching arbitrator gradually changes and increases the power level of the drive-start-side inverter from zero when the single-sided drive mode is switched to the dual-sided drive mode. When the dual-sided drive mode is switched to the single-sided drive mode, the switching arbitrator gradually changes and decreases the level of power of the drive-end-side inverter to zero.

Here, the term drive-start-side inverter refers to an inverter that starts switching drive from the current idle state. The drive-end-side inverter is an inverter that terminates the switching drive that has been performed and shifts to an idle state. The term zero of the power level is not limited to the 0 W in a strict sense, but includes a small value within a range determined to be near zero based on the common knowledge in the relevant technical field. The term gradual change refers to a level of rate change that feedback control can follow.

The switching arbitrator of the disclosure makes the output of the motor continuous before and after the switching by gradually changing the power level of each inverter at the time of the drive mode switching. Consequently, it is possible to avoid damage of the apparatus caused by torque fluctuation of the motor or overcurrent generated during the fluctuation. The torque of the motor can be prevented from fluctuating due to the influence of the power fluctuation caused by the operation at the time of the drive mode switching.

An electric motor drive device according to a second aspect of the disclosure controls, by using two inverters individually connected to two power sources, driving of a motor including a first winding set and a second winding set of three or more phases connected by a star connection or a delta connection. Such an electric motor drive device includes a first inverter, a second inverter, and a control unit.

The first inverter includes multiple first switching elements that receive DC power from the first power source and are disposed to correspond to the phases of the first winding set, and is connected to the second winding set. The second inverter includes multiple second switching elements that receive DC power from the second power source and are disposed to correspond to the phases of the second winding set, and is connected to the first winding set. The configuration of the control unit is the same as that of the electric motor drive device of the first aspect.

An electric motor drive device according to a third aspect of the disclosure controls the driving of a motor including two or more phases of open windings of which end points are open to each other, using two inverters individually connected to a common power source. The electric motor drive device includes a first inverter, a second inverter, a common high-potential-side wiring, a common low-potential side wiring, a switch, and a control unit.

The first inverter includes a plurality of first switching elements so disposed as to correspond to the phases of the open windings, and is connected to one ends of the open windings. The second inverter includes a plurality of second switching elements so disposed as to correspond to the phases of the open windings, and is connected to the other ends of the open windings. The common high-potential-side wiring connects high-potential-side wirings of the first and second inverters. The common low-potential-side wiring connects low-potential-side wirings of the first and second inverters. The switch is disposed on at least one of the common high-potential-side wiring and the common low-potential-side wiring and is capable of interrupting off a current path.

An electric motor drive device according to the third aspect is capable of operating the other inverter in the single-sided drive mode in a star connection circuit formed by neutral point coupling of the one inverter in an open state of the switch. With an H-bridge circuit including the first switching element and the second switching element of the respective corresponding phases with the switch closed, operation is possible in the dual-sided drive mode. In the control unit, at least one inverter control circuit has a function of adjusting the level of the power supplied from the common power source to the two inverters. Other configurations of the control unit are the same as that of the electric motor drive device of the first aspect.

An electric motor drive device according to a fourth aspect of the disclosure controls, by using two inverters connected to a common power source, driving of a motor including a first winding set and a second winding set of three or more phases connected by a star connection or a delta connection. The motor is, for example, a six-phase dual motor including two sets of three-phase windings. The electric motor drive device includes a first inverter, a second inverter, a common high-potential-side wiring, a common low-potential side wiring, and a control unit.

The first inverter includes a plurality of first switching elements disposed in correspondence to the respective phases of the first winding set, and is connected to the first winding set. The second inverter includes a plurality of second switching elements disposed in correspondence to the respective phases of the second winding set, and is connected to the second winding set. The configuration of the common high-potential-side wiring, the common low-potential side wiring, and the control unit is the same as that of the electric motor drive device of the third aspect.

Embodiments of an electric motor drive device will now be described with reference to the drawings. The first to sixth embodiments are collectively referred to as the present embodiment. The electric motor drive device according to the present embodiment is a device that controls the driving of a motor generator (MG), which is a three-phase AC motor, in a system in which two inverters drive the MG, which is a power source of a hybrid or electric vehicle. The terms MG and MG control device in the embodiment respectively correspond to the terms motor and electric motor drive device.

The first, fourth, fifth, and sixth embodiments combine different numbers of power sources in the system to which the MG control device is applied and different winding configurations of the MG. As for the number of power sources, two power sources or one common power source is used. As for the winding configuration of the MG, open windings in which end points are uncoupled, i.e., are open, or two winding sets that are star-connected and delta-connected are used. The first embodiment is applied to a two-power source, open winding system, and the fourth embodiment is applied to a one-power source, open winding system. The fifth embodiment is applied to a two-power sources, two-open winding set system, and the sixth embodiment is applied to a one-power source, two-open winding set system.

The second and third embodiments have the same system configuration as that of the first embodiment except that the drive mode switching control differs. The switching control of the second and third embodiments can also be used in the system configurations of the fourth to sixth embodiments. Mainly the first to third embodiments will be described in detail below. For the fourth to sixth embodiments, the technical concepts of the first to third embodiments are applied as they are or with some modifications.

[System Configuration of First Embodiment]

FIG. 1 illustrates the overall configuration of a two-power source, two-inverter system of the first embodiment i.e., a system that uses two power sources 11 and 12 and two inverters 60 and 70. The system configuration in FIG. 1 is also applied to the second and third embodiments. An MG 80 is a permanent magnet synchronous type 3-phase AC motor including a U-phase winding 81, a V-phase winding 82, and a W-phase winding 83. When the system is applied to a hybrid vehicle, the MG 80 has a function as a motor that generates torque for driving the drive wheels, and a function as a generator that can generate electricity by being driven by the kinetic energy of the vehicle transmitted from the engine and the drive wheels.

In the MG 80 of the first embodiment, the three-phase windings 81, 82, and 83 have an open winding configuration in which the end points are not coupled to each other. The output terminals of the respective phases of the first inverter 60 are connected to one ends 811, 821, and 831 of the three-phase open windings 81, 82, and 83, and the output terminals of the respective phases of the second inverter 70 are connected to the other ends 812, 822, and 832 of the three-phase open windings 81, 82, and 83. A rotation angle sensor 85 includes a resolver, and detects a machine angle θm of the MG 80. The machine angle θm is converted to an electrical angle θe by an electrical angle calculator 87 of a control unit 300.

The first power source 11 and the second power source 12 are two independent power sources insulated from each other, and each of them is a chargeable/dischargeable electrical storage device, e.g., a secondary battery such as nickel hydrogen, lithium ion, or the like, an electric double layer capacitor, or the like. For example, an output type lithium-ion battery may be used as the first power source 11, and a capacity type lithium-ion battery may be used as the second power source 12. The power of the power sources 11 and 12 is represented by state of charge (SOC).

The two inverters 60 and 70 individually receive input of DC power from the two power sources 11 and 12. The first power source 11 can exchange power with the MG 80 via the first inverter 60, and the second power source 12 can exchange power with the MG 80 via the second inverter 70. The output of the first inverter 60 is equal to the power of the first power source 11, and the output of the second inverter 70 is equal to the power of the second power source 12. The current flowing from the first power source 11 to the first inverter 60 is referred to as a first power source current Ib1, and the current flowing from the second power source 12 to the second inverter 70 is referred to as a second power source current Ib2.

The MG 80 receives power from the first power source 11 via the first inverter 60, and receives power from the second power source 12 via the second inverter 70. A U-phase voltage VU1, a V-phase voltage VV1, and a W-phase voltage VW1 are applied to the three-phase open windings 81, 82, and 83 from the first inverter 60 side. A U-phase voltage VU2, a V-phase voltage VV2, and a W-phase voltage VW2 are applied to the three-phase open windings 81, 82, and 83 from the second inverter 70 side.

A current sensor 84 for detecting the phase currents applied to the three-phase open windings 81, 82, and 83 is disposed, for example, in the power path from the first inverter 60 to the MG 80. In the example of FIG. 1, a V-phase current Iv and a W-phase current Iw are detected, but any two-phase or three-phase current may be detected. The current sensor 84 may be disposed in the power path from the second inverter 70 to the MG 80, or in paths of both the first inverter 60 and the second inverter 70.

A first capacitor 16 is connected between a high-potential-side wiring P1 and a low-potential-side wiring N1, and a second capacitor 17 is connected between a high-potential-side wiring P2 and a low-potential-side wiring N2. A first voltage sensor 18 detects a first power source voltage VH1 input from the first power source 11 to the first inverter 60. A second voltage sensor 19 detects a second power source voltage VH2 input from the second power source 12 to the second inverter 70. The first power source voltage VH1 and the second power source voltage VH2 may be equal or different. A shared power P_INV1 of the first inverter 60 is represented by P_INV1=Ib1×VH1, and a shared power P_INV2 of the second inverter 70 is represented by P_INV2=Ib2×VH2. The power sum P_INV1+P_INV2 of the two inverters 60 and 70 is input to the MG 80.

An MG control device 101 includes the first inverter 60, the second inverter 70, the control unit 300, and drive circuits 67 and 77. The first inverter 60 is so provided as to correspond to the respective phases of the open windings 81, 82, and 83, and includes six bridge-connected first switching elements 61 to 66. The switching elements 61, 62, and 63 are upper-arm switching elements of the U-phase, the V-phase, and the W-phase, respectively, and the switching elements 64, 65, and 66 are lower-arm switching elements of the U-phase, the V-phase, and the W-phase, respectively. The second inverter 70 is so provided as to correspond to the respective phases of the open windings 81, 82, and 83, and includes six bridge-connected second switching elements 71 to 76. The switching elements 71, 72, and 73 are upper-arm switching elements of the U-phase, the V-phase, and the W-phase, respectively, and the switching elements 74, 75, and 76 are lower-arm switching elements of the U-phase, the V-phase, and the W-phase, respectively.

The respective switching elements 61 to 66 and 71 to 76 are implemented by, for example, IGBTs, and are connected in parallel with flywheel diodes that permit current to flow from the low-potential side to the high-potential-side. To prevent short-circuiting between the high-potential-side wirings P1 and P2 and the low-potential-side wirings N1 and N2, the upper arm elements and the lower arm elements of the respective phases are controlled so that they are not simultaneously turned on and are turned on and off complementarily, that is, one is turned on when the other is turned off.

The control unit 300 is implemented by a microcomputer or the like, and includes a CPU, a ROM, an I/O and a bus line connecting these components (not illustrated). The control unit 300 executes control by software processing by executing, by a CPU, a program previously stored in a tangible memory device (that is, a readable non-temporary tangible recording medium), such as a ROM, and hardware processing by a dedicated electronic circuit.

The control unit 300 includes a first inverter control circuit 301 that generates a first voltage command or output voltage command to the first inverter 60, and a second inverter control circuit 302 that generates a second voltage command or output voltage command to the second inverter, based on information of a torque command trq* and a detected value. Information such as an electrical angle θe and power source voltages VH1 and VH2 is input to the respective inverter control circuits 301 and 302. The first drive circuit 67 outputs, to the first inverter 60, a gate signal based on the first voltage command generated by the first inverter control circuit 301. The second drive circuit 77 outputs, to the second inverter 70, a gate signal based on the second voltage command generated by the second inverter control circuit 302.

Temperature sensors 861, 862, 863, 864, and 865 respectively detect the temperature Hb1 of the first power source 11, the temperature Hb2 of the second power source 12, the temperature Hinv1 of the first inverter 60, the temperature Hinv2 of the second inverter 70, and the temperature Hmg of the MG 80, and reports the temperatures to the control unit 300. The temperatures of the respective components are one of the determination factors in the drive mode switching determination described below.

[Overview of Single-Sided Drive Mode and Dual-Sided Drive Mode]

The control mode in which one of the two inverters 60 and 70 performs switching drive is referred to as a single-sided drive mode, and a control mode in which both inverters 60 and 70 perform switching drive referred to as a dual-sided drive mode. The present embodiment focuses on the operation of switching between the single-sided drive mode and the dual-sided drive mode. As an example of switchover from the single-sided drive mode to the dual-sided drive mode, switchover from the single-sided drive mode by the first inverter 60 to the dual-sided drive mode will now be mainly described. Since the switchover from the single-sided drive mode by the second inverter 70 to the dual-sided drive mode is also similar, description thereof is omitted but does not limit the functional means.

Figure 2A:
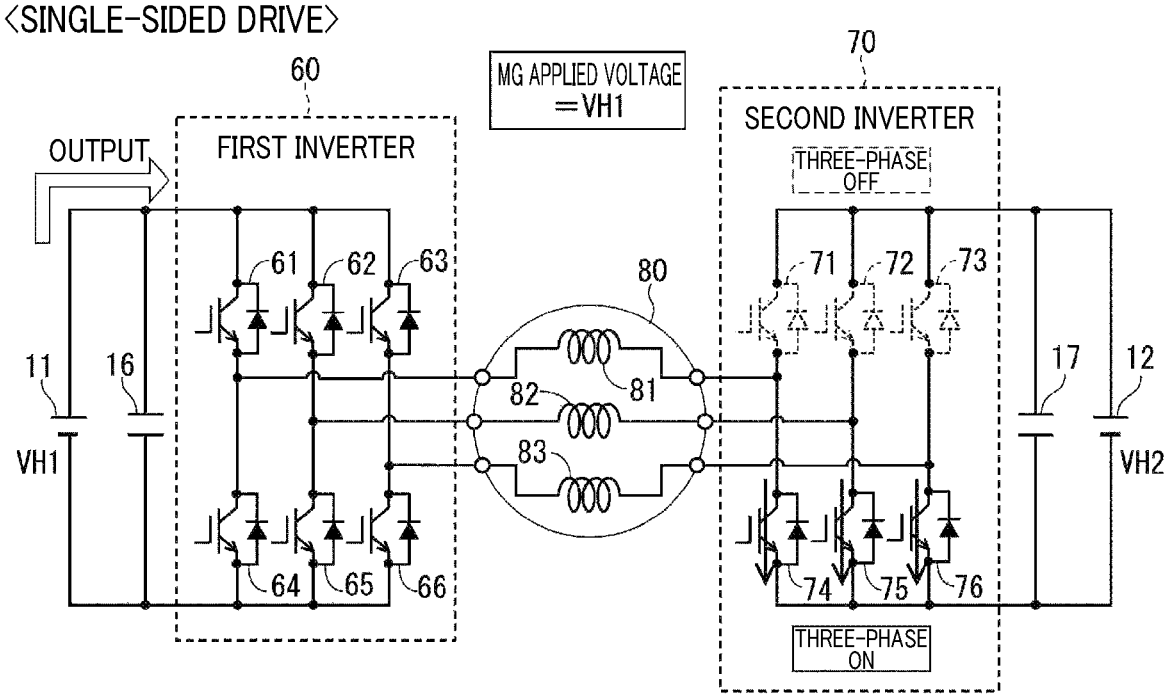
FIG. 2A is a diagram illustrating switching drive in a single-sided drive mode.
Figure 2B:
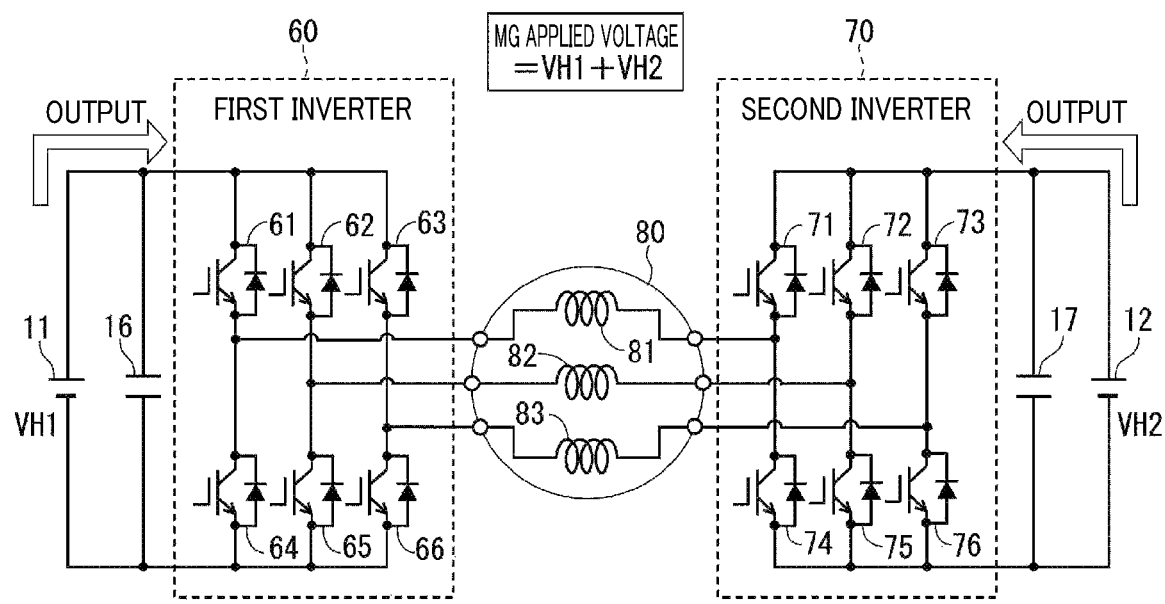
FIG. 2B is a diagram illustrating switching drive in a dual-sided drive mode.

FIG. 2A illustrates switching drive in the single-sided drive mode, and FIG. 2B illustrates switching drive in the dual-sided drive mode. In the single-sided drive mode, only the first inverter 60 performs switching drive. In the second inverter 70, one of the upper-arm switching elements 71, 72, and 73 and the lower-arm switching elements 74, 75, and 76 of the respective phases are turned on and the other is turned off to electrically establish neutral point coupling. In the dual-sided drive mode, both inverters 60 and 70 perform switching drive to serialize the voltages of the two power sources 11 and 12.

Figure 3A:
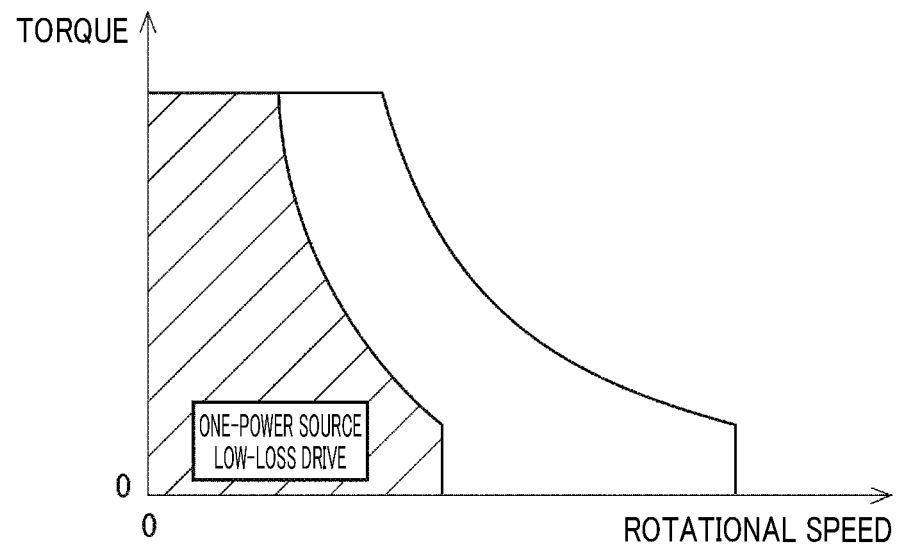
FIG. 3A is an N-T characteristic diagram illustrating the region in which the single-sided drive mode is applied.
Figure 3B:
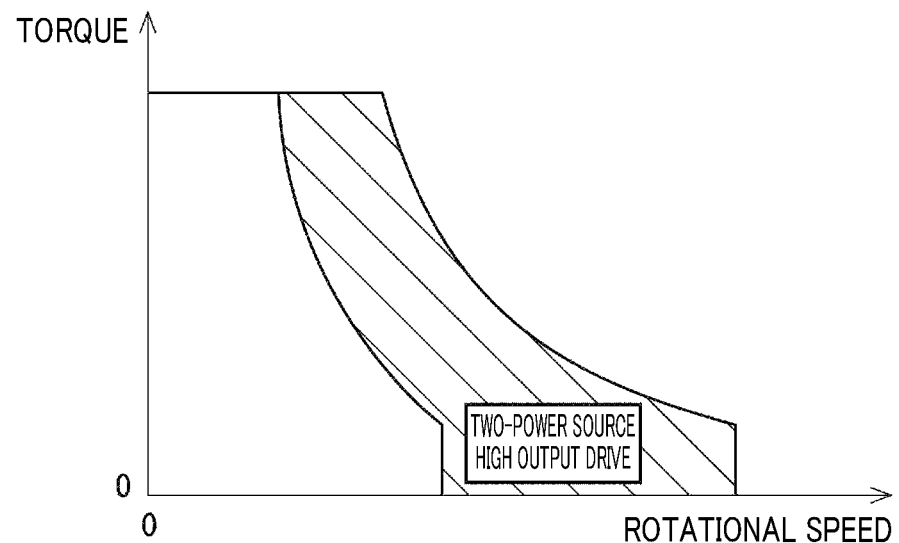
FIG. 3B is an N-T characteristic diagram illustrating the region in which the dual-sided drive mode is applied.

The N-T characteristic diagrams of FIGS. 3A and 3B are referred to for illustrating the concept of drive mode switching. The hatched area in each drawing is a preferred area to which the drive mode is applied. The single-sided drive mode illustrated in FIG. 3A is advantageous under low load because it has the advantage of high efficiency under low load and the disadvantage of a low upper limit for high load performance. The dual-sided drive mode illustrated in FIG. 3B is advantageous under high load because it has the advantage of a high upper limit for high load performance and the disadvantage of low efficiency under low load.

Therefore, driving in which output and efficiency are compatible can be achieved by maintaining sufficient output in the dual-sided drive mode under high load and switching over to the single-sided drive mode under low load to achieve low loss drive.

[Problems and Focus Points]

As an unavoidable problem of the two-power source, two-inverter system, the voltage across the two ends of the MG always suddenly changes when the drive mode is switched. That is, the two inverters 60 and 70 each independently output voltage pulses, and the voltage to be applied to the MG coils is determined by the voltage pulses. In other words, unless the outputs of the respective inverters 60 and 70 are controlled to optimum values required by the MG 80 at that point in time, torque fluctuation occurs because of current disturbance caused by excessive or insufficient voltage. In the worst case, overcurrent generated by excessive voltage application may cause component failure.

Therefore, an object of the first embodiment is to stabilize the MG output before and after the drive mode switching and to maintain continuity in accordance with the principle that desired MG output and inverter outputs can be obtained by independently and concertedly controlling the outputs of the respective inverters 60 and 70. More specifically, the following three points should be taken into consideration.

[1] Gradually change the outputs of the inverters at the rising and falling edges when the drive mode is switched to avoid sharp change in the outputs.

[2] Eliminate output fluctuation through instantaneous correction of a voltage command for the purpose of eliminating the cause of output change of a self-inverter within the self-inverter.

[3] Achieve both high output drive and low loss drive at low output by stable switching at the timing of target MG output by appropriately and uniquely determining the switching without depending on a state change before and after the switching.

[Configuration of Control Unit]

Figure 4:
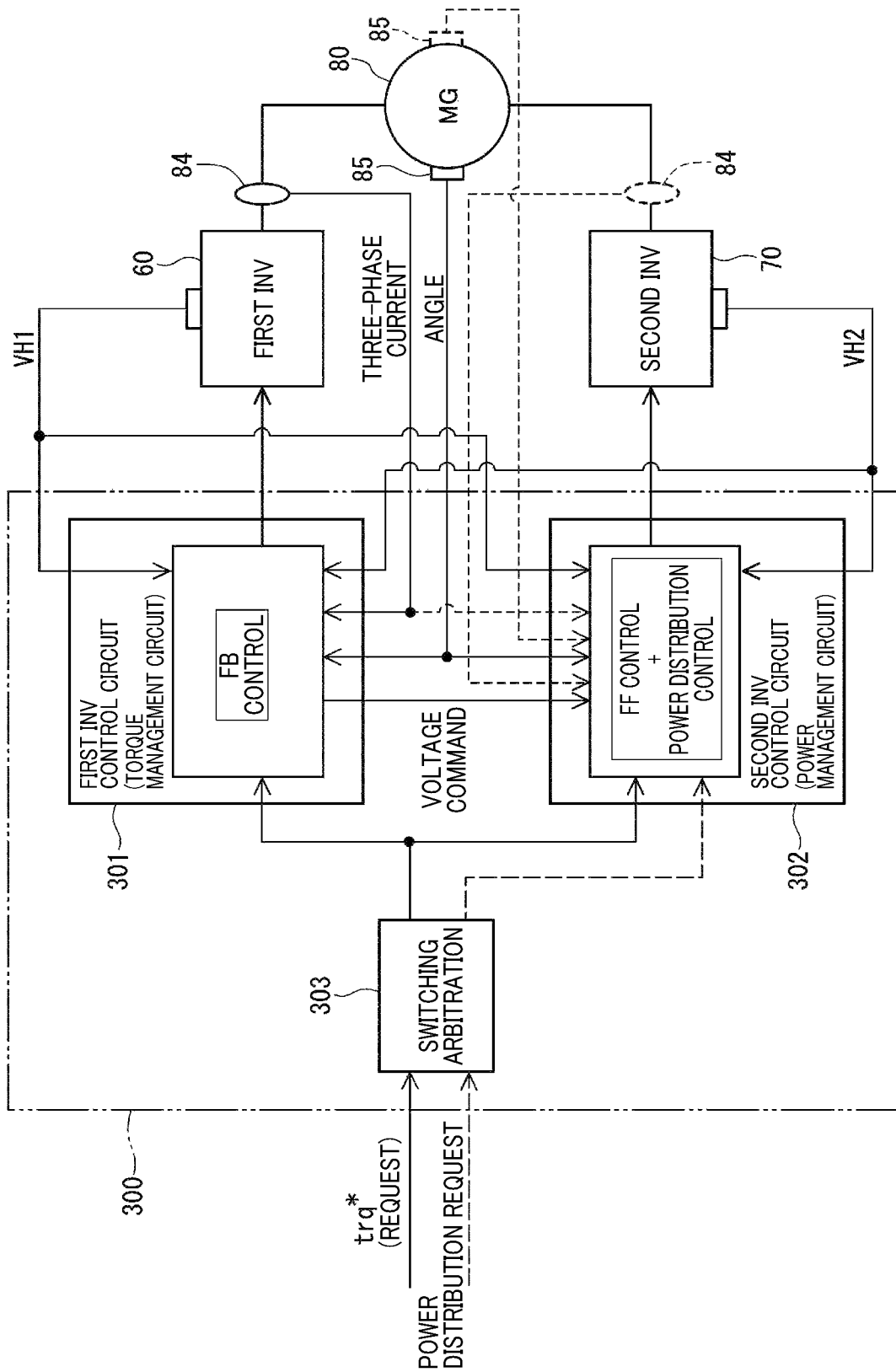
FIG. 4 is a schematic configuration diagram of a control unit of the first embodiment.

FIG. 4 illustrates the schematic configuration of the control unit 300. In the following drawings, the inverter is referred to as INV. The first inverter control circuit 301 and the second inverter control circuit 302 respectively drive the first inverter 60 and the second inverter 70 by dq control (i.e., vector control in dq axis coordinates). The inverter control circuits 301 and 302 may be disposed in separate microcomputers, or may be disposed in one common microcomputer. The respective inverter control circuits 301 and 302 generate independent and concerted voltage commands for the system to work as a two-power source, two-inverter system.

Since the MG 80 is shared, the detected values of the angle (specifically, the electrical angle θe) and the three-phase current may be shared as information obtained by the control unit 300. However, as indicated by the dashed lines, multiple current sensors 84 and rotation angle sensors 85 may be provided, and the inverter control circuits 301 and 302 may obtain the corresponding detected values. When feedforward control is performed, the second inverter control circuit 302 may not acquire the detected values of the three-phase current as indicated by the dashed lines.

At least one of the inverter control circuits of the control unit 300 has a function of adjusting the level of power supplied from the two power sources 11 and 12 to the two inverters 60 and 70. In the configuration illustrated of FIG. 4, the first inverter control circuits 301 serves as a torque management circuit and provides torque through feedback control. The second inverter control circuit 302 serves as a power management circuit and manages the power through feedforward control and power distribution control.

The power management circuit has a function of adjusting the level of power supplied from the two power sources 11 and 12 to the two inverters 60 and 70. The power distribution control manages the distribution of power supplied from the two power sources 11 and 12 to the two inverters 60 and 70. In the following drawings, feedback is denoted as FB and feedforward is denoted as FF. Note that the roles of the first inverter control circuit 301 and the second inverter control circuit 302 may be switched.

In this configuration, while the first inverter control circuit 301 performs feedback control to correct the disturbance suppression so that the torque follows the command, the second inverter control circuit 302 performs feedforward control uniquely determined by the command to manage the power of the respective inverters 60 and 70. Since, in this way, the power management circuit adjusts the inverter power while the torque management circuit performs feedback control to correct the disturbance suppression, the control unit 300 achieves both the desired MG torque and the desired power source power without any control interference.

However, since the inverter control circuits 301 and 302 independently perform dq control to drive the respective inverters 60 and 70, the MG torque (output) and the inverter power readily fluctuate unless the voltage across the MG coil ends generated by concerted inverter commands are optimal for the MG 80. Such fluctuation becomes more significant in the scene of switching between the single-sided drive mode and the dual-sided drive mode in which the voltage across the MG coil ends changes the most in a short time.

Therefore, the control unit 300 of the present embodiment includes a switching arbitrator 303 that determines the switching between the single-sided drive mode and the dual-sided drive mode after the respective inverter control circuits 301 and 302 are sets to assume the roles of torque management and power management, and arbitrates the outputs of the respective inverters 60 and 70 at the time of switching. The switching arbitrator 303 arbitrates change in the power level so as not to be affected by change in the voltage across the MG coil ends at the time of switching between the single-sided drive mode and the dual-sided drive mode, and makes the MG output before and after the switching continuous.

In the configuration of FIG. 4, the torque commands trq* and the power distribution requests from external higher-order control circuits are once input to the switching arbitrator 303, and then reported to the respective inverter control circuits 301 and 302. However, alternative to such a configuration, the torque commands trq* and the power distribution requests from external devices may be input to the respective inverter control circuits 301 and 302 and then reported to the switching arbitrator 303.

The switching arbitrator 303 gradually changes and increases the power level of the drive-start-side inverter from zero at the time of switchover from the single-sided drive mode to the dual-sided drive mode. At the time of switchover from the dual-sided drive mode to the single-sided drive mode, the switching arbitrator 303 gradually changes and decreases the power level of the drive-end-side inverter to zero. A power level of zero is not limited to 0 W in a strict sense, but includes a small value within a range determined to be near zero based on the common knowledge in the relevant technical field. Consequently, the continuity of the MG output can be maintained and the control fluctuation can be eliminated without depending on change in voltage across the MG coil ends.

Here, the term drive-start-side inverter refers to an inverter that has been in an idle state and start switching drive. The term drive-end-side inverter refers to an inverter that ends the switching drive that has been performed and shifts to an idle state. When the first inverter single-sided drive mode switches over to the dual-sided drive mode, the second inverter 70 corresponds to the drive-start-side inverter. When the dual-sided drive mode switches over to the first inverter single-sided drive mode, the second inverter 70 corresponds to the drive-end-side inverter.

The specific operation of drive mode switching will now be described for each embodiment. The first and second embodiments describe the operation of shifting from the first inverter single-sided drive mode to the dual-sided drive mode or from the dual-sided drive mode to the first inverter single-sided drive mode. The third embodiment describes the operation of shifting from the first inverter single-sided drive mode to the second inverter single-sided drive mode through the dual-sided drive mode.

First Embodiment

Figure 5A:
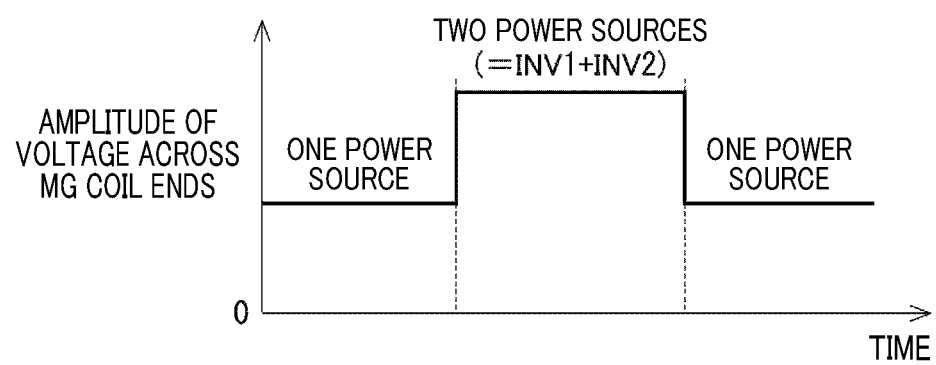
FIG. 5A is a diagram for explaining fluctuation in the voltage across MG coil ends at the time of switching between the single-sided drive mode and the dual-sided drive mode.

A control configuration according to the first embodiment relating to the switching between the first inverter single-sided drive mode and the dual-sided drive mode will be described with reference to FIGS. 5A to 12B. As illustrated in FIG. 5A, the amplitude of the voltage across the MG coil ends in the single-sided drive mode is voltage amplitude corresponding to one power source, and in the dual-sided drive mode is voltage amplitude corresponding to two power sources. Therefore, the voltage across the MG coil ends always changes before and after the switching between the single-sided drive mode and the dual-sided drive mode. This is an unavoidable problem for a two-power, two-inverter system. If the system cannot respond to such change in the voltage across ends of the MG coil, which is directly connected to the generation of three-phase current, excessive or insufficient voltage required for causing desired current to flow is generated across the MG coil ends, and current disturbance will readily occur due to the relationship between the electric circuits and the pulse voltage outputs.

Figure 5B:
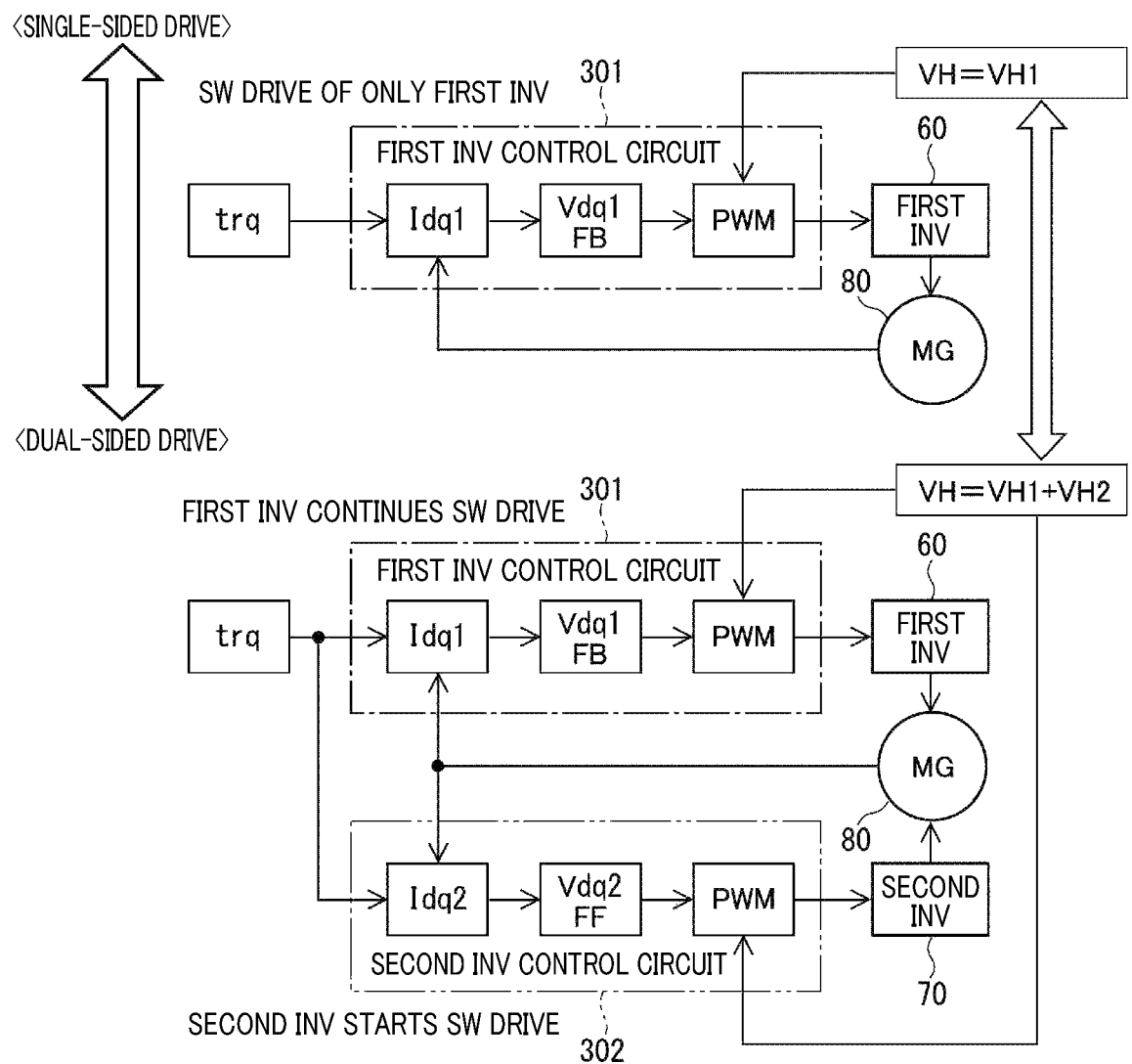
FIG. 5B is a schematic control configuration diagram of the time of switching between the single-sided drive mode and the dual-sided drive mode.

FIG. 5B illustrates a schematic control configuration of the switching between the first inverter single-sided drive mode and the dual-sided drive mode. The basic control configuration in FIG. 5B including calculation of a current command Idq, calculation of a voltage command Vdq, and PWM control is a well-known technique and thus a description thereof will be omitted. Hereinafter, a d-axis current command Id and a q-axis current command Iq are collectively referred to as a current command Idq, and a d-axis voltage command Vd and a q-axis voltage command Vq are collectively referred to as a voltage command Vdq. Here, the d-axis voltage command Vd is zero or a negative value, and the phrase Vdq increases/decreases means that the absolute values of the d-axis voltage command Vd and the q-axis voltage command Vq increase/decrease.

During switching drive by only the first inverter 60, the first power source voltage VH1 is applied as an input voltage for PWM control. During switching drive of the both inverters 60 and 70 in which the switching drive of the second inverter 70 is started while the switching drive of the first inverter 60 continues, a voltage sum (VH1+VH2) of the two power sources is applied as an input voltage for PWM control. In this way, switching occurs in the control from an MG viewpoint. If, at the time of drive mode switching, synchronized switching of the respective inverters 60 and 70 cannot be performed, and applied voltage excessive or insufficient relative to the required voltage is generated, current disturbance occurs.

Figure 7:
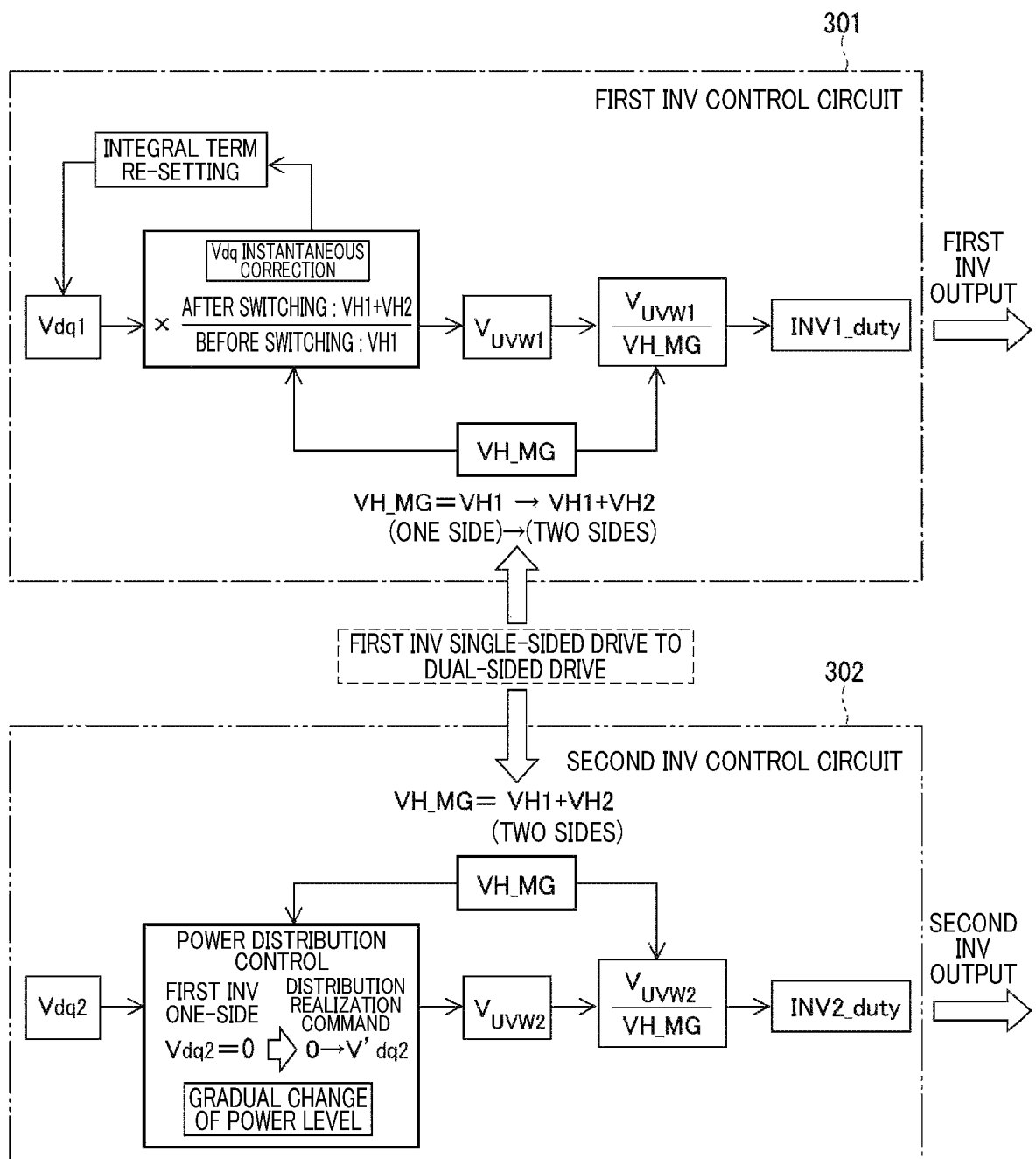
FIG. 7 is a control block diagram for executing the drive mode switching process (instantaneous correction of voltage command and gradual change in power level) according to the first embodiment.

In the first embodiment, the following switching process is executed to avoid the occurrence of excess or deficiency in the applied voltage and maintain the continuity of the MG output. The drive mode switching process according to the first embodiment will now be described with reference to the flowchart of FIG. 6 and the control block diagram of FIG. 7. In the description of the flowchart below, the symbol S denotes a step. In FIG. 7, it is assumed that the first inverter control circuit 301 is the torque management circuit, and the second inverter control circuit 302 is the power management circuit.

In S10, the switching arbitrator 303 performs switching determination in accordance with an output request to the MG 80, the SOC state of the power sources 11 and 12, or the temperature of the power sources 11 and 12, the inverters 60 and 70, or the MG 80. A specific example of the switching determination will be described below with reference to FIG. 8. In S21, a voltage recognition value is set. The voltage recognition value is determined by the power source voltages VH1 and VH2 of the respective inverters in the single-sided drive mode, and determined by the voltage sum (VH1+VH2) of the two power sources in the dual-sided drive mode.

In S22, the voltage command Vdq is instantaneously corrected at the time of drive mode switching. At the time of switchover from the first inverter single-sided drive mode to the dual-sided drive mode, the voltage command Vdq1 is instantaneously corrected by expression (1.1). At the time of switchover from the dual-sided drive mode to the first inverter single-sided drive mode, the voltage command Vdq1 is instantaneously corrected by expression (1.2).

[Math. 1]

$$Vdq \longrightarrow Vdq \times \frac{VH1 + VH2}{VH1} \quad (1.1)$$

$$Vdq \longrightarrow Vdq \times \frac{VH1}{VH1 + VH2} \quad (1.2)$$

A supplementary description of the technical significance of instantaneous correction is provided. As it is well known, feedback control is follow-up control of a primary delay system. Since the MG 80 includes coils, it is a primary delay system as an electric circuit. Therefore, it is clear that the response of the MG control for controlling the MG 80 of the primary delay system by the control of the primary delay system is a primary delay. Therefore, the response to sharp change in the MG coil end voltage, i.e., stepwise change due to instantaneous superposition of the output pulse voltages of both inverters 60 and 70, such as in the case of the two-power source, two-inverter configuration, is always a first order delay. Accordingly, in the first embodiment, such problem is solved by instantaneously correcting the voltage command Vdq. In the following second embodiment, the problem is solved by performing a slow change process.

In S23, since the inverter output and consequently the MG output continue to maintain continuity, the voltage command Vdq1 is set as the amount to be transferred to the next control process. In the first inverter control circuit 301, which is the torque management circuit, an integral term of the feedback control is reset. In the second inverter control circuit 302, which is the power management circuit, a voltage command Vdq2 is set for power calculation in feedforward control. In S24, the power level of the output from the second inverter control circuit 302 for power management is gradually changed so as not to cause disturbance to the first inverter control circuit 301 for torque management.

Supplementary description will be provided for the above-described switching process with reference to the block diagram of FIG. 7. In the instantaneous correction block of the first inverter control circuit 301, the voltage command Vdq1 is instantaneously corrected in accordance with the voltage recognition value only at the time of switching. In the integral term resetting block, the amount to be transferred to the next feedback control is matched only at the time of switching. Consequently, a duty ratio INV1 duty commanded by the first inverter 60 is outputted while maintaining continuity with that before and after switching.

In the power distribution control block of the second inverter control circuit 302, the voltage command Vdq2 is gradually changed and increased from zero at a changing rate that can be flowed by the feedback control of the first inverter control circuit 301. Consequently, a duty ratio INV2 duty in which the sharp change during switching is suppressed is commanded to the second inverter 70.

Figure 8:
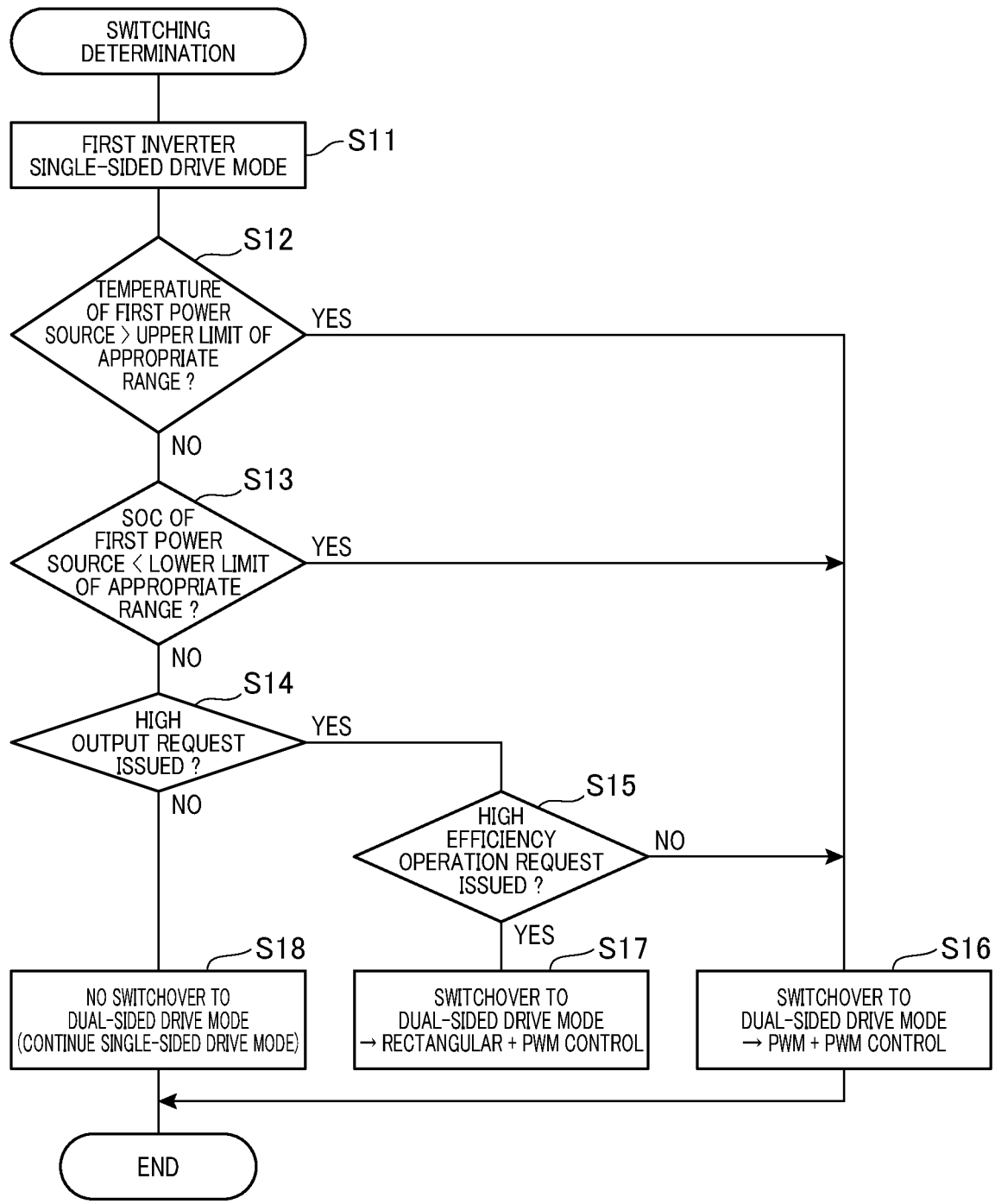
FIG. 8 is a sub-flowchart illustrating a specific example of the switching determination in FIG. 6.

Supplementary description will be provided on the details of the determination of switchover from the single-sided drive mode to the dual-sided drive mode in S10 of FIG. 6 with reference to the sub-flowchart of FIG. 8. In S11, the MG control device 101 is driven in the first inverter single-sided drive mode. In S12, it is determined whether the temperature Hb1 of the first power source 11 is higher than the upper limit of the appropriate range. In S13, it is determined whether the SOC of the first power source 11 is lower than the lower limit of the appropriate range. If YES in S12 or S13, it is preferable to reduce the load on the first power source 11 regardless of a high output request. Then, the process proceeds to S16, and the switching arbitrator 303 determines to switchover from the first inverter single-sided drive mode to the dual-sided drive mode.

In the dual-sided drive mode of S16, it is preferable that a pattern in which the inverters 60 and 70 are both driven in the PWM control mode is selected, and that the power is actively adjusted so that the temperature and the SOC of the first power source 11 fall within appropriate ranges. Note that the output may be limited depending on the temperature of the first power source 11.

If NO in S12 and S13, it is determined in S14 whether there is a high output request to the MG 80. If YES in S14, it is further determined in S15 whether there is a request for high efficiency operation. If YES in S15, the process proceeds to S17, and the switching arbitrator 303 determines to switchover from the first inverter single-sided drive mode to the dual-sided drive mode. In the dual-sided drive mode of S17, high efficiency operation is executed by selecting a pattern in which the inverter on the high-power level side is driven in a rectangular wave control mode and the other inverter is driven in a PWM control mode.

If YES in S14 and NO in S15, the process proceeds to S16, and the inverters 60 and 70 are both driven in the PWM control mode in the dual-sided drive mode. In such a case, normal operation which is not intentional efficient operation is performed in response to the torque command and the power command. When NO in S14, the current output in the single-sided drive mode is sufficient, and there is no need to reduce the load on the first power source 11. Therefore, the process proceeds to S18, and the switching arbitrator 303 determines not to switchover to the dual-sided drive mode.

Regarding the control modes selected in the dual-sided drive mode, in the PWM control mode, multiple pulses corresponding to the carrier wave frequency are output in one electrical cycle based on a comparison of the voltage command and the carrier wave, and in the rectangular wave control mode, one pulse is output in one electrical cycle. The PWM control mode includes a sine wave control mode and an overmodulation control mode depending on the voltage utilization factor. Since these control modes are well known techniques, detailed description thereof will be omitted. Moreover, the means and method for selecting a control mode will not be described in detail because they are not included in the scope of the specification.

The operation for switchover from the single-sided drive mode to the dual-sided drive mode will now be described in comparison with a comparative example and the first embodiment, with reference to the time charts of FIGS. 9 and 10. The power source voltages are equal, and the power distribution ratio is 1:1. In the comparative example illustrated in FIG. 9, no measures are taken to ensure continuity at the time of drive mode switching. In the first embodiment illustrated in FIG. 10, the above-described instantaneous correction and gradual change in power level are performed as a measure for ensuring continuity at the time of switching.

Each drawing illustrates, in order from top to bottom, changes in the torque of the MG 80, the rotational speed, the MG output, the voltage across the MG coil ends, the power source current, the d-axis voltage command Vd, and the q-axis voltage command Vq. The MG output is proportional to the product of torque and rotational speed. The power source voltage recognition value of each of the inverter control circuits 301 and 302 corresponds to the voltage across the MG coil ends. The vertical axis is provided with no specific value other than 0 (zero). The quantities other than the d-axis current command Vd take zero or a positive value, and the d-axis current command Vd takes 0 or a negative value. The dot-and-dash lines in the drawings indicate quantities related to the first inverter, and the dashed-two dotted lines indicate quantities related to the second inverter. The same applies to the following time charts illustrating the switching operation.

Figure 9:
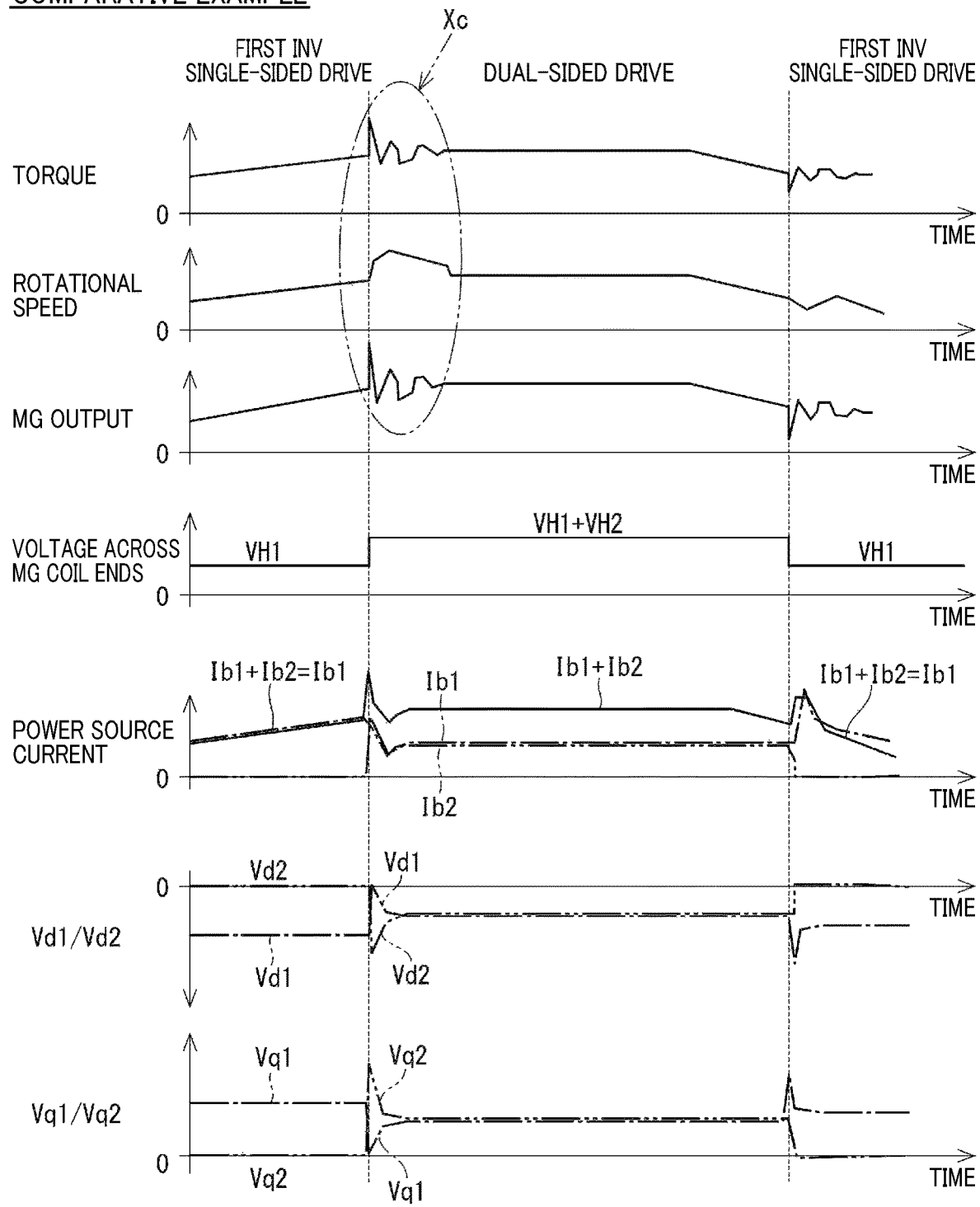
FIG. 9 is a time chart illustrating drive mode switching operation according to a comparative example.
Figure 10:
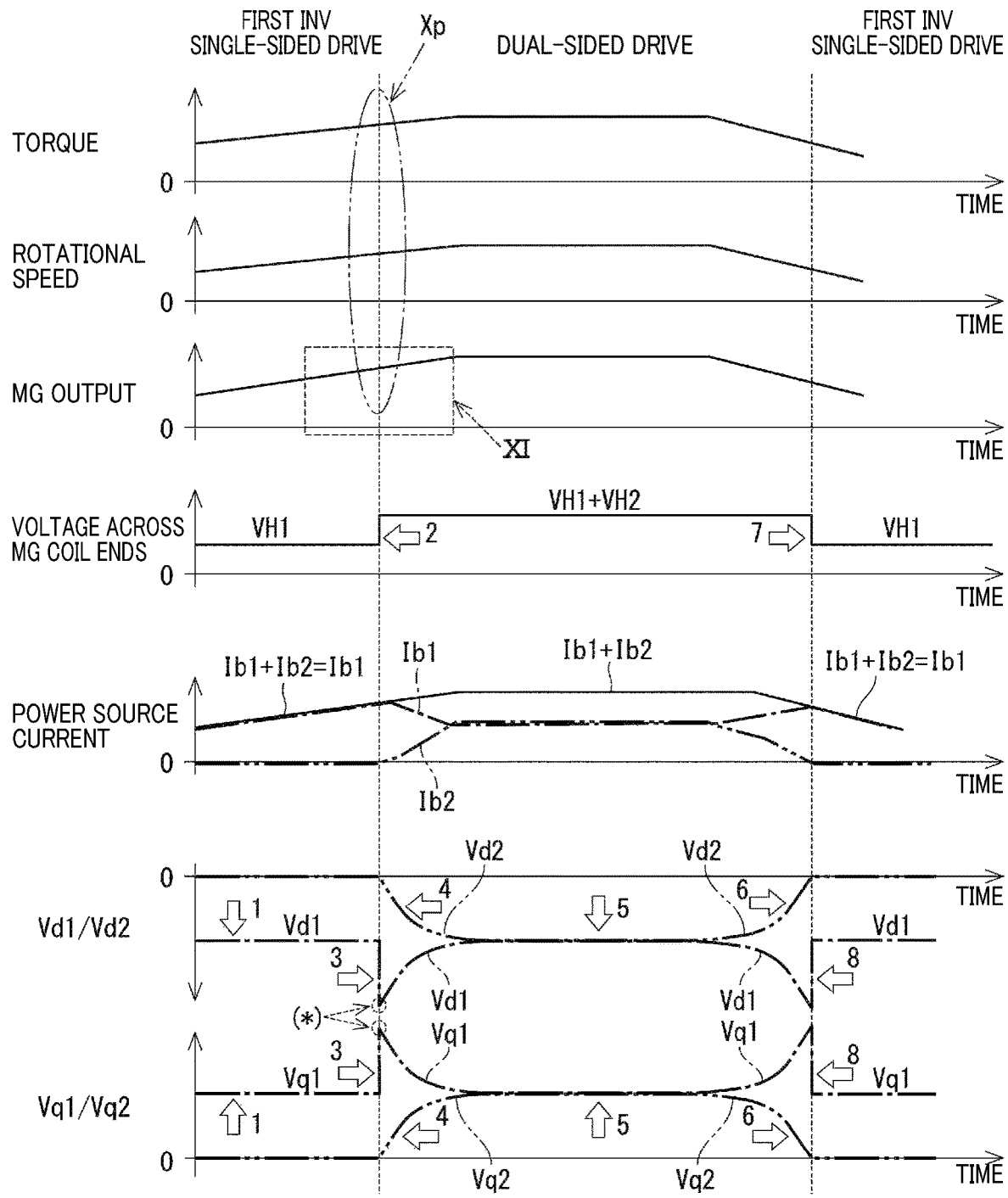
FIG. 10 is a time chart illustrating drive mode switching operation according to the first embodiment.

In both FIGS. 9 and 10, the drive mode switches from the first inverter single-sided drive mode to the dual-sided drive mode, and then switches from the dual-sided drive mode to the first inverter single-sided drive mode. Along with this, the amplitude of the voltage across the MG coil ends switches from the first power source voltage VH1 to the voltage sum (VH1+VH2) of the two power sources, and then switches from the voltage sum (VH1+VH2) of the two power sources to the first power source voltage VH1.

In the first inverter single-sided drive mode, only the first power source current Ib1 flows, and the second power source current Ib2 is zero. Therefore, the sum of the power source currents is Ib1+Ib2=Ib1. In the dual-sided drive mode, the current sum (Ib1+Ib2) of two power sources flows. In the first inverter single-sided drive mode, the first voltage command Vdq1 takes a non-zero value, and the second voltage command Vdq2 is zero. In the dual-sided drive mode, the first voltage command Vdq1 and the second voltage command Vdq2 take a same value that is not zero.

At the time of the drive mode switching, the voltage across the MG coil ends changes stepwise. At this time, in the comparative example in which a measure is not taken to ensure continuity, the voltage commands Vdq1 and Vdq2 suddenly change, and the torque and power fluctuate as in section (Xc). That is, the torque and the power change discontinuously. In contrast, in the first embodiment, the first voltage command Vdq1 is instantaneously corrected for the stepwise change of the voltage across the MG coil ends, and the second voltage command Vdq2 changes by following this. Since the power level of the MG output is gradually changed, the torque and the power do not fluctuate when the driving mode is switched, as indicated by the section (Xp). Therefore, the torque and the power change while maintaining continuity.

The operation of the driving mode switching of FIG. 10 will be described in the numerical order of 1 to 8. At operation 1, the first inverter 60 performs single-sided drive. At operation 2, the power source voltage recognition value switches from VH1 to (VH1+VH2) based on the switching determination. At operation 3, the voltage command Vdq1 of the first inverter 60 is instantaneously corrected based on the power source voltage recognition values before and after the switching.

Then, the value to be transferred to the next integration cycle is set as an integral term based the values indicated by (*). As a specific example, when there is an addition term different from the feedback control, the value is processed, e.g., subtracted and transferred, and set to an integral term that can maintain continuity between the control cycles. The transferred value has the same effect as the PI integral term. At operation 4, the switching arbitrator 303 gradually changes and increases the output of the second inverter 70 from zero so that the first inverter 60 can respond.

At operation 5, the first inverter 60 and the second inverter 70 perform dual-sided drive. At operation 6, the switching arbitrator 303 gradually changes and decreases the output of the second inverter 70 to zero so that the first inverter 60 can respond. At operation 7, the power source voltage recognition value is switched from (VH1+VH2) to VH1 based on the switching determination. At operation 8, the voltage command Vdq1 of the first inverter 60 is instantaneously corrected based on the power source voltage recognition value. Then, the value set based on the voltage command Vdq1 applied immediately after the switchover from the single-sided drive mode is transferred to the next integration cycle.

Figure 11:
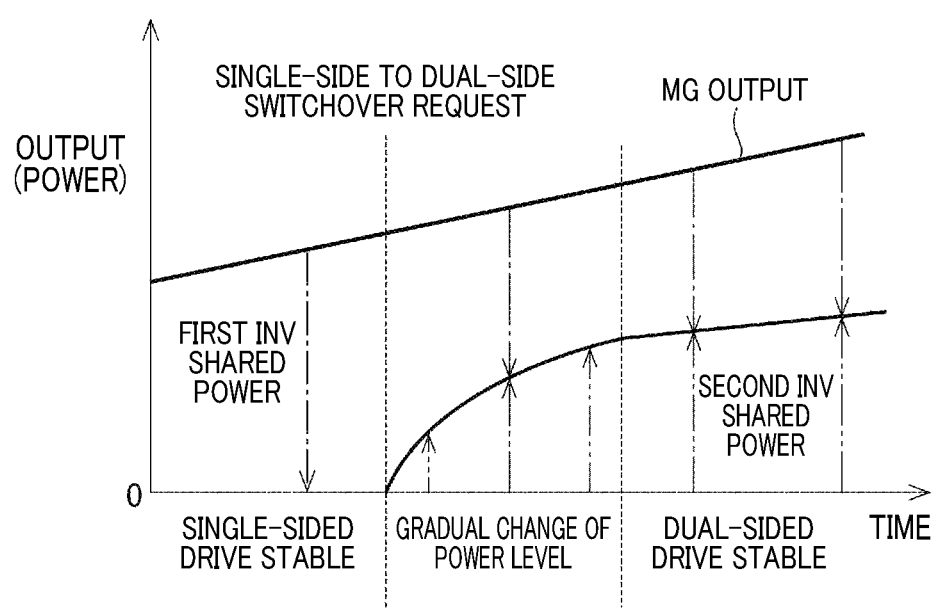
FIG. 11 is a diagram for explaining gradual change in power distribution corresponding to an enlarged view of the XI portion in FIG. 10.

FIG. 11 illustrates change in the power distribution of the inverters 60 and 70 in the MG output at the time of drive mode switching. In the stable stage of the first inverter single-sided drive mode, the shared power of the first inverter 60 occupies 100%. In the power level gradual change stage, the shared power of the second inverter 70 gradually increases. In the stable stage of the dual-sided drive mode, the distribution ratio of the first inverter 60 and the second inverter 70 is constant.

[Method of Determining Switching Between Single-Sided Drive Mode and Dual-Sided Drive Mode]

A drive mode switching determination method capable of accurately (i.e., reliably) and uniquely determining when the MG output reaches a target output. Regarding the voltage utilization factor as a premise of the switching determination, the voltage utilization factor in a typical one-power source, one inverter configuration will now be described.

<One-Power Source, One-Inverter Configuration>

A drive mode switching request is assumed to be a switching request corresponding to a target or a scene such as the power source state (for example, SOC), the temperature of the power sources, the inverters, or the MG, or the MG output state (e.g., the voltage utilization factor). Among these factors, the voltage utilization factor, which is an index indicating the MG output state, is calculated by the following expression. The line voltage amplitude corresponds to the peak value of the fundamental wave amplitude. The inverter input voltage is equal to the power source voltage VH.

Voltage utilization factor=inverter line voltage amplitude/inverter input voltage Here, when the voltage utilization factor is VUF, the conversion coefficient is K, and the dq axis voltage amplitude is |Vdq|, the above expression is represented as expression (2). Note that, since the conversion coefficient K is uniquely determined by determining how the voltage utilization factor is expressed, it is omitted from the following expressions including FIGS. 12A and 12B.

[Math. 2]

$$VUF = K \times \frac{|Vdq|}{VH} \qquad (2)$$

<Two-Power Source, Two-Inverter Configuration>

In the dual-sided drive mode of the two-power source, two-inverter configuration, the voltage utilization factor used for MG control is calculated by dividing the inverter line voltage for each inverter by the sum of the two-power source voltages, as in the following expression.

Voltage utilization factor used for MG control=inverter line voltage/sum of two-power source voltage The voltage utilization factor used for MG control is the voltage utilization factor in the MG viewpoint utilized for grasping the control state, and, hereinafter, denoted by the symbol VUF_MG. Voltage utilization factors VUF_MG_INV1 and VUF_MG_INV2 used for MG control of the respective inverters are represented by expressions (3.1) and (3.2) using the dq-axis voltages Vdq1 and Vdq2.

[Math. 3]

$$VUF\_MG\_INV1 = \frac{|Vdq1|}{VH1 + VH2} \qquad (3.1)$$

$$VUF\_MG\_INV2 = \frac{|Vdq2|}{VH1 + VH2} \qquad (3.2)$$

Figure 12A:
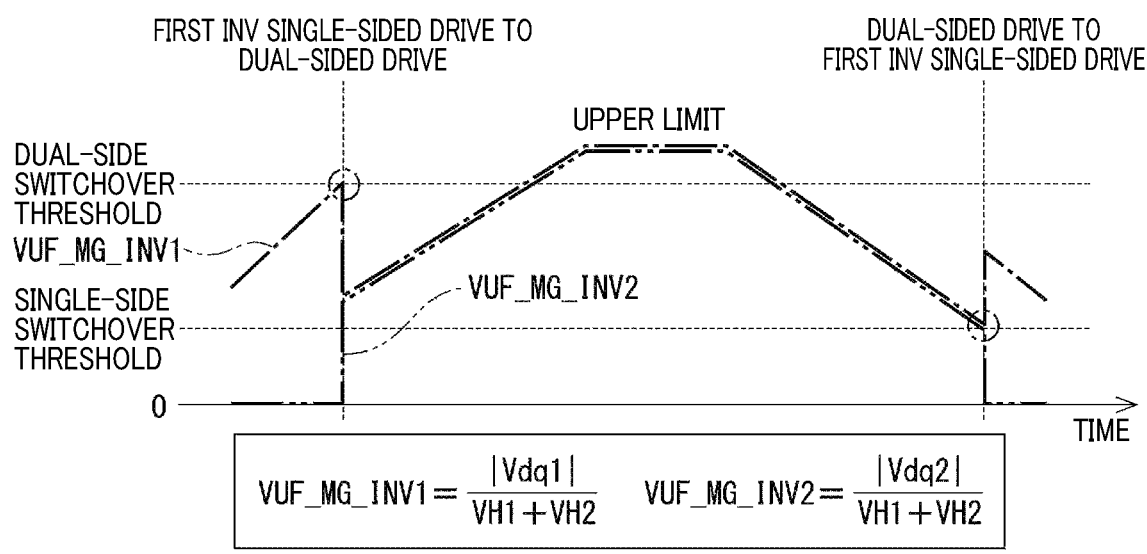
FIG. 12A is a diagram illustrating switching determination by a voltage utilization factor used for MG control.

FIG. 12A illustrates the operation of switching determination using the voltage utilization factor VUF_MG used for MG control. In the first inverter single-sided drive mode, when the first inverter voltage utilization factor VUF_MG_INV1 increases and reaches a two-side switching threshold, the VUE drive mode switches to dual-sided drive mode. At this time, the second inverter voltage utilization factor VUF_MG_2 increases stepwise from zero, and the first inverter voltage utilization factor VUF_MG_INV1 decreases stepwise.

In the dual-sided drive mode, the voltage utilization factor VUF_MG_INV1 and VUF_MG_INV2 of both inverters increase together, reach the upper limit, and then decrease together. Subsequently, when the voltage utilization factor VUF_MG_INV1 and VUF_MG_INV2 of both inverters reach a one-side switching threshold, the drive mode switches to the first inverter single-sided drive mode.

Switching determination using a self-inverter voltage utilization factor VUF self as another voltage utilization factor will now be described. The self-inverter voltage utilization factor is calculated by dividing the inverter line voltage for each inverter by input voltage of each inverter, as in the following expression.

Self-inverter voltage utilization factor=inverter line voltage/inverter input voltage Hereinafter, the self-inverter voltage utilization factor is denoted by the symbol VUF self Self-inverter voltage utilization factors VUF self INV1 and VUF self INV2 of the respective inverters are expressed by expression (4.1) and (4.2) using dq-axis voltages Vdq1 and Vdq2.

[Math. 4]

$$VUF\_self\_INV1 = \frac{|Vdq1|}{VH1} \quad (4.1)$$

$$VUF\_self\_INV2 = \frac{|Vdq2|}{VH2} \quad (4.2)$$

For example, when operation is performed in the single-sided drive mode to the limit, the upper threshold of the self-inverter voltage utilization factor VUF self refers to the output limit of one inverter in switching drive. That is, by determining the switching timing using the self-inverter voltage utilization factor VUF self, it can be determined whether the region is one in which a desired output can be obtained by one inverter. That is, by comparing the self-inverter voltage utilization factor VUF self and a threshold reflecting a desired voltage utilization factor, the switching timing of the single-sided drive mode and the dual-sided drive mode can be determined with respect to the MG output state.

According to this method, even if a variation in the device constant occurs due to errors of the sensors, change in the MG magnetic flux due to the temperature characteristic, etc., a target switching point can be correctly determined while taking into consideration the state. It is preferable to prevent hunting of switching by providing hysteresis in the threshold value used for the switchover from the single-sided drive mode to the dual-sided drive mode and the threshold value used for the switchover from the dual-sided drive mode to the single-sided drive mode.

Figure 12B:
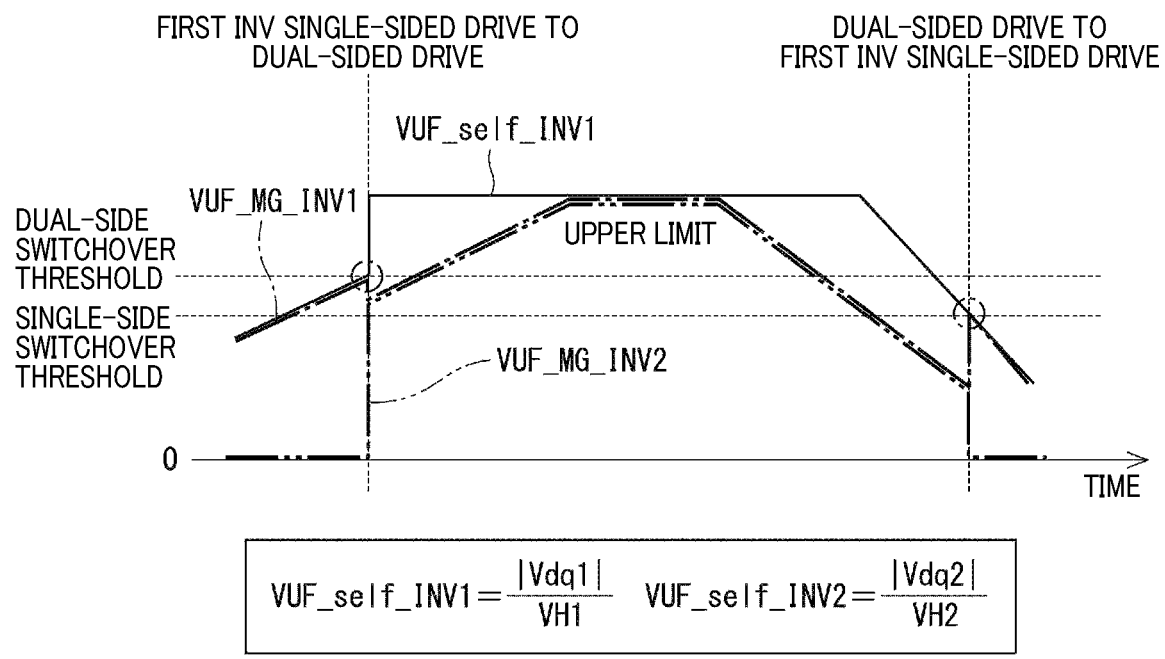
FIG. 12B is a diagram illustrating switching determination by a self-inverter voltage utilization factor.

FIG. 12B illustrates the operation of switching determination using the self-inverter voltage utilization factor VUF self. In the first inverter single-sided drive mode where VH2=0, the self-inverter voltage utilization factor VUF self INV1 of the first inverter is equal to the voltage utilization factor VUF_MG_INV1. When the self-inverter voltage utilization factor VUF self INV1 increases and reaches the two-side switching threshold, the drive mode switches to the dual-sided drive mode. At this time, the self-inverter voltage utilization factor VUF self INV1 of the first inverter increases stepwise.

The operation of the voltage utilization factors VUF_MG_ INV1 and VUF_MG_INV2 in the dual-sided drive mode is the same as that of FIG. 12A. Even if the voltage utilization factors VUF_MG_INV1 and VUF_MG_INV2 of both inverters fall below the upper limit, they do not pertain to the switching determination. When the self-inverter voltage utilization factor VUF self INV1 reaches the one-side switching threshold, the drive mode switches to the first inverter single-sided drive mode.

[Effects]

(1) The switching arbitrator 303 of the first embodiment arbitrates the outputs of the respective inverters 60 and 70 at the time of switching so that the MG outputs before and after drive mode switching continue. Consequently, the MG control device 101 can stabilize and ensure continuity of the MG output at the time of switching between the single-sided drive mode and the dual-sided drive mode in the two-power source, two-inverter configuration. Furthermore, it is possible to prevent failure of components due to overcurrent caused by excessive voltage application.

(2) In specific, at the time of switchover from the single-sided drive mode to the dual-sided drive mode, the switching arbitrator 303 gradually changes and increases the power level of the drive-start-side inverter from zero. At the time of switchover from the dual-sided drive mode to the single-sided drive mode, the switching arbitrator 303 gradually changes and decreases the power level of the drive-end-side inverter to zero. Consequently, changes in the output of the inverters can be mitigated at the rising edge and falling edge at the time of drive mode switching, and fluctuation in the torque of the motor caused by the influence of power fluctuation can be eliminated.

(3) The switching arbitrator 303 performs switching determination in accordance with an output request to the MG 80, the SOC state of the power sources 11 and 12, or the temperature of the power source 11 and 12, the inverters 60 and 70, or the MG 80. Consequently, it is possible to determine whether the drive mode can be switched in accordance with the drive state.

(4) The switching arbitrator 303 determines the switching between the single-sided drive mode and the dual-sided drive mode based on the self-inverter voltage utilization factor VUF self calculated by dividing the inverter line voltage by the inverter input voltage for at least one of the inverters. Consequently, a switching threshold can be set independently of the power source voltage difference, and the switching determination can be uniquely executed.

(5) The first embodiment provides a control configuration in which, in the single-sided drive mode, the output of the inverters is determined based on one of the power source voltages, and in the dual-sided drive mode, the output of the respective inverters is determined based on the sum of the two-power source voltages. At the time of the drive mode switching, the switching arbitrator 303 instantaneously corrects the voltage command Vdq1 in response to sudden change in the sum of the two-power source voltages and transfers it to the next processing cycle. Consequently, in the first embodiment, the influence of sudden change in voltage at the time of drive mode switching can be suppressed, and stable inverter drive can be achieved.

Second Embodiment

The second embodiment will now be described with reference to FIG. 13. Similar to the first embodiment, the second embodiment has a control configuration in which, in the single-sided drive mode, the output of the inverters is determined based on one of the power source voltages, and in the dual-sided drive mode, the output of the respective inverters is determined based on the sum of the two-power source voltages. In the second embodiment, the switching arbitrator 303 executes a slow change process for gradually changing the voltage recognition value for control in response to a sudden change in the sum of the two-power source voltages as a response means for a stepwise change due to instantaneous superposition of the output pulse voltages of the inverters 60 and 70 at the time of drive mode switching.

Specifically, in the slow change process, the amount of change per time of the power source voltage recognition value is limited by an arbitrary time constant delay filter or rate processing. That is, while instantaneous voltage correction is performed in the first embodiment, continuous voltage correction is performed in the second embodiment to suppress output fluctuation.

Figure 13:
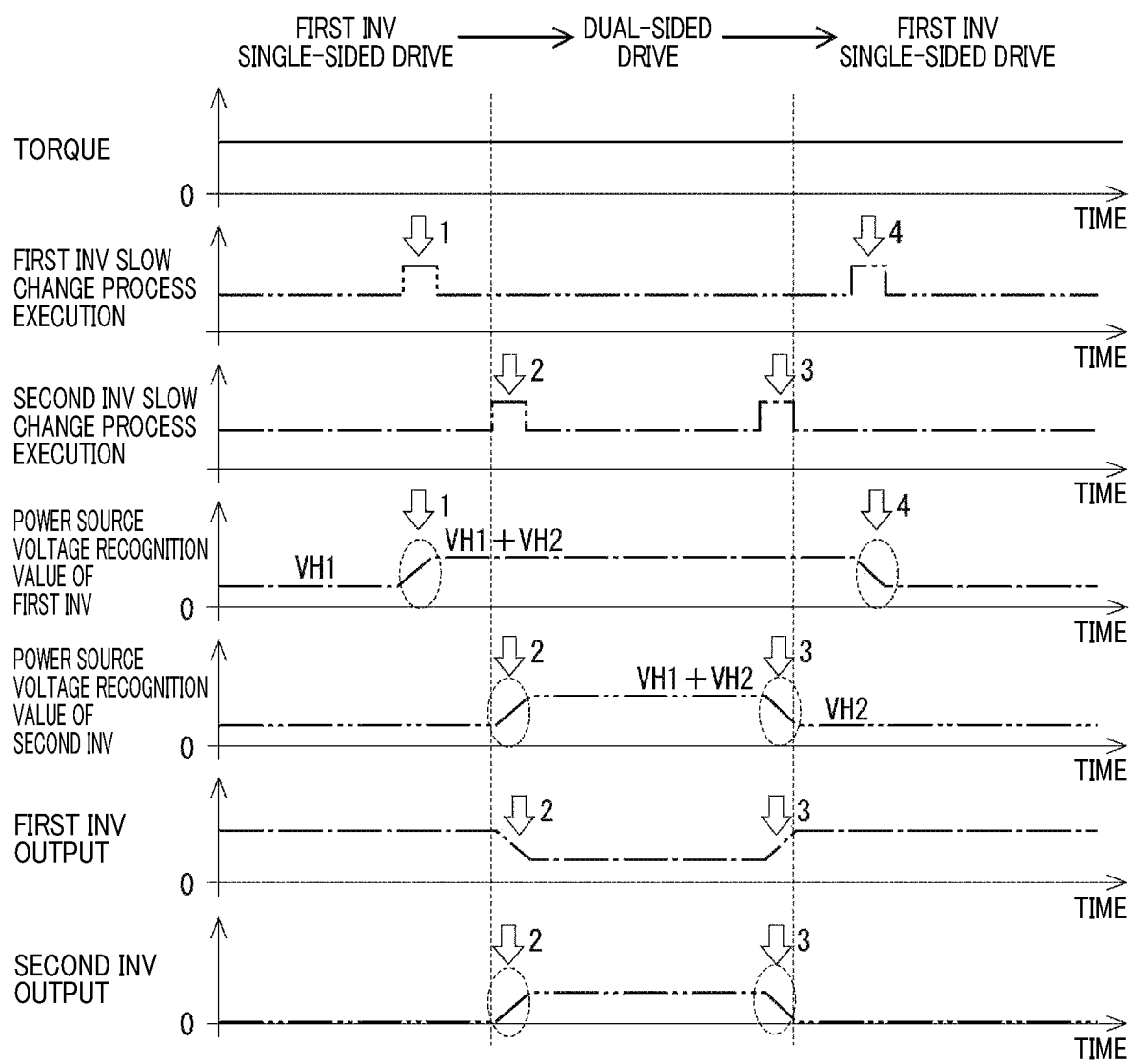
FIG. 13 is a time chart illustrating the operation in a slow change process according to a second embodiment.

FIG. 13 illustrates the operation of the slow change process in the transition from the first inverter single-sided drive mode to the dual-sided drive mode and the transition from the dual-sided drive mode to the first inverter single-sided drive mode. The first inverter 60 executes the slow change process of operations 1 and 4, and the second inverter 70 executes the slow change process of operations 2 and 3.

When the first inverter single-sided drive mode is switched to the dual-sided drive mode, at operation 1, the switching arbitrator 303 switches the power source voltage recognition value of the first inverter 60 from VH1 to (VH1+VH2) through the gradual change process. At operation 2, the switching arbitrator 303 gradually changes and increases the output of the second inverter 70 at the rising edge from through the slow change process. Along with this, the output of the first inverter 60 is made to respond without difficulty so as to shift to a stable dual-sided drive mode.

When the dual-sided drive mode is switched to the first inverter single-sided drive mode, at operation 3, the switching arbitrator 303 switches the power source voltage recognition value of the second inverter 70 from (VH1+VH2) to VH1 through the gradual change process. At operation 4, the switching arbitrator 303 gradually changes and decreases the output of the second inverter 70 at the rising edge to zero through the slow change process. Along with this, the output of the first inverter 60 is made to respond without difficulty so as to shift to a stable single-sided drive mode. Thus, in the second embodiment, the influence of sudden change in voltage at the time of drive mode switching can be suppressed, and stable inverter drive can be achieved.

Third Embodiment

The control configuration according to the third embodiment relating to switchover from a single-sided drive mode by one inverter to a single-sided drive mode by the other inverter will now be described with reference to FIGS. 14A to 18. For example, if only one power source is continuously used in the single-sided drive mode under low load, the power consumption becomes biased, and the power source temperature rises. In the case where the power source is a battery, the SOC may become biased and depleted. Therefore, it is effective to switch the power source being used by stopping the inverter that is being driven in the single-sided drive mode and driving the inverter that has been stopped in the single-sided drive mode.

In such switchover from the first inverter single-sided drive mode to the second inverter single-sided drive mode, the voltage across the MG coil ends always changes between before and after the switching due to a power source voltage difference and various machine differences including the inverters, regardless of the control method. This is an unavoidable problem in the two-power, two-inverter system. If the system cannot respond to such change in the voltage across ends of the MG coil, which is directly connected to the generation of three-phase current, excessive or insufficient voltage required for causing desired current to flow is generated across the MG coil ends, and current disturbance will readily occur due to the relationship between the electric circuits and the pulse voltage outputs.

Figure 14A:
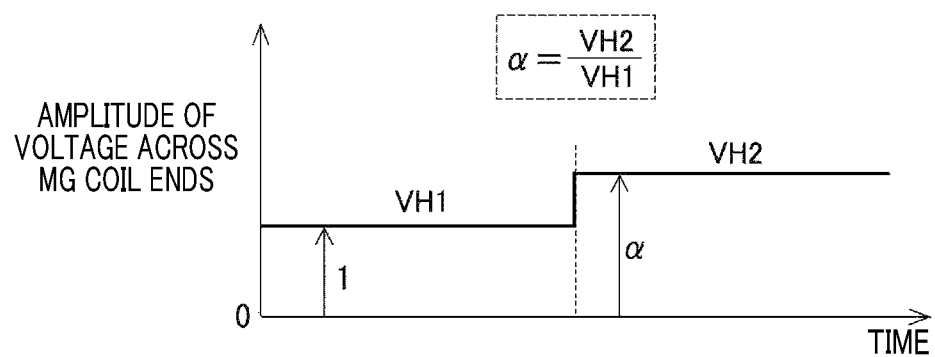
FIG. 14A is a diagram for explaining fluctuation in the voltage across MG coil ends at the time of switchover from a first inverter single-sided drive to a second inverter single-sided drive mode.

As illustrated in FIG. 14A, the amplitude of the voltage across the MG coil ends is the voltage amplitude VH1 of the first power source 11 in first inverter one-side driving, and the voltage amplitude VH2 of the second power source 12 in second inverter one-side driving. Here, as the voltage ratio of the two power sources, the ratio of the second power source voltage VH2 to the first power source voltage VH1 is denoted by a. For example, when the first power source voltage VH1 is 200 V and the second power source voltage VH1 is 400 V, α is 2.

Figure 14B:
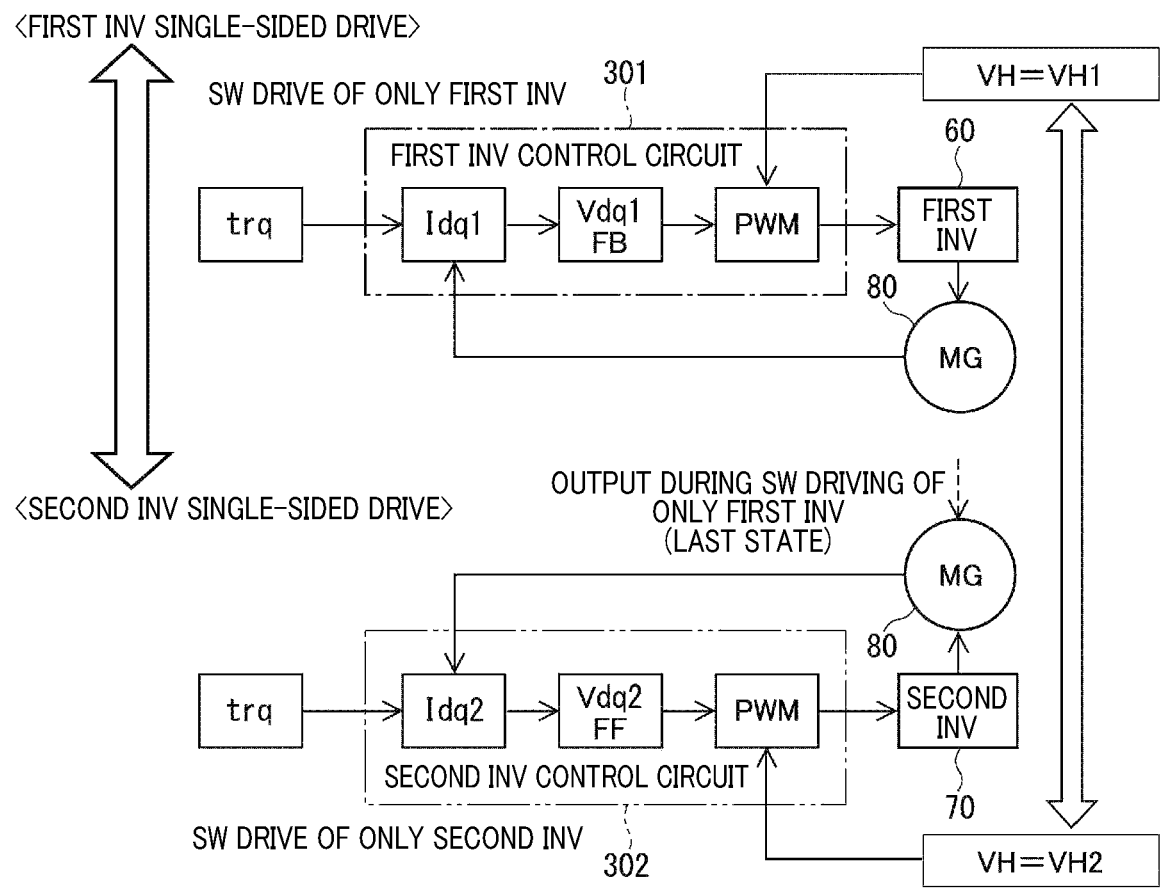
FIG. 14B is a schematic control configuration diagram at the time of switchover from first inverter single-sided drive to second inverter single-sided drive.

FIG. 14B illustrates a schematic control configuration at the time of switchover from the first inverter single-sided drive mode to the second inverter single-sided drive mode. During switching drive by only the first inverter 60, the first power source voltage VH1 is applied as an input voltage for PWM control. In contrast, during switching drive only by the second inverter 70, the second power source voltage VH2 is applied as an input voltage for PWM control. Therefore, if there is an excess or shortage of applied voltage occurs at the time of drive mode switching relative to the voltage immediately before the switchover, the inverter output is not appropriately transferred, and current disturbance occurs.

Therefore, in the third embodiment, the dual-sided drive mode is entered before switching between the first inverter single-sided drive mode and the second inverter single-sided drive mode in order to eliminate the power source voltage difference and machine difference. In the dual-sided drive mode, the inverter control circuit 301 and 302 generate inverter voltage commands Vdq1 and Vdq2, respectively, in consideration of the power source voltage difference and the machine difference.

FIG. 15A illustrates an example of a control configuration of switchover from the first inverter single-sided drive mode to the second inverter single-sided drive mode. At the time of switchover from the first inverter single-sided drive mode to the dual-sided drive mode, the voltage command Vdq1 of the first inverter 60 is multiplied by (VH1+VH2)/VH1 (=1+α), which is the ratio of the voltage recognition values before and after the switchover through instantaneous correction of the power source voltage recognition values.

In the dual-sided drive mode, power distribution control is performed so as to gradually change the power level of the first inverter 60. At the start of the dual-sided drive mode, the voltage command Vdq1 of the first inverter 60 is equal to the MG output, and the voltage command Vdq2 of the second inverter 70 is zero. At the end of the dual-sided drive mode, the voltage command Vdq1 of the first inverter 60 is zero, and the voltage command Vdq2 of the second inverter 70 is equal to the MG output. During this time, output arbitration is performed.

At the time of switchover from the dual-sided drive mode to the second inverter single-sided drive mode, the ratio of the voltage recognition values before and after the switchover, VH2/(VH1+VH2), is multiplied and transferred as the voltage command Vdq2 of the second inverter 70 through the instantaneous correction of the power source voltage recognition values. The value of the ratio is converted as in expression (5).

[Math. 5]

$$\frac{VH2}{VH1+VH2} = \frac{\alpha}{1+\alpha} \quad (5)$$

As described above, in the case of switchover from the single-sided drive mode by one inverter to the single-sided drive mode by the other inverter, the switching arbitrator 303 transfers a value obtained by multiplying the voltage command Vdq1 output by the drive-end-side inverter by a correction coefficient based on the voltage ratio α of the two power sources as the voltage command Vdq2 of the drive-start-side inverter.

Figure 15B:
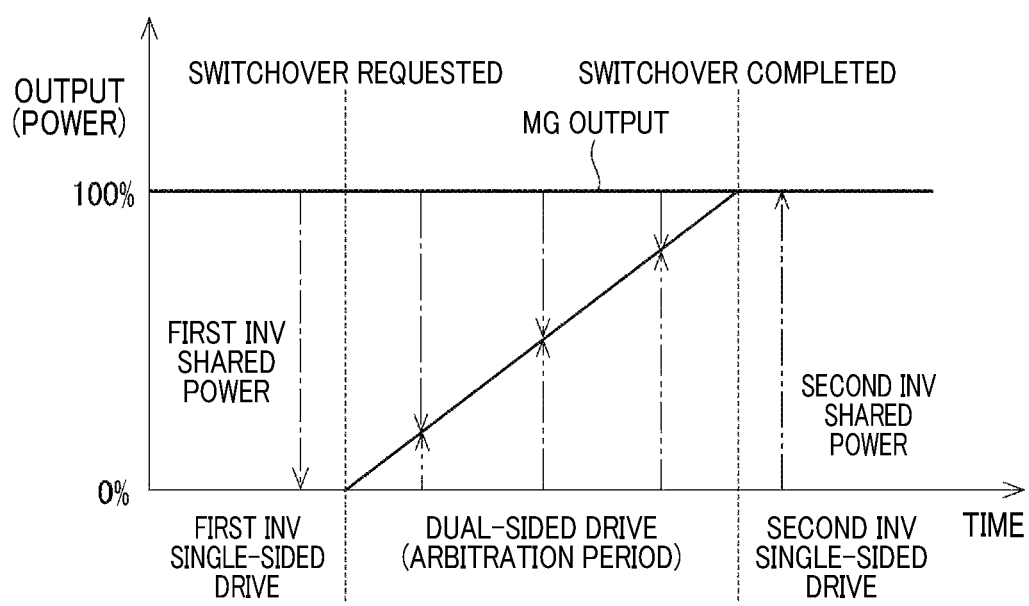
FIG. 15B is a control block diagram for executing the drive mode switching process according to the third embodiment.

As illustrated in FIG. 15B, the switching arbitrator 303 gradually decreases the output (i.e., the power level) of the first inverter 60 on the drive-end-side from 100% to 0% while in the dual-sided drive mode, and gradually increases the output of the second inverter 70 on the drive-start-side from 0% to 100% to transfer the power level. At this time, the power is gradually changed at a changing rate level that can be followed by the feedback control. When the output of the first inverter 60 falls 0%, the switching arbitrator 303 stops the first inverter 60.

Figure 16:
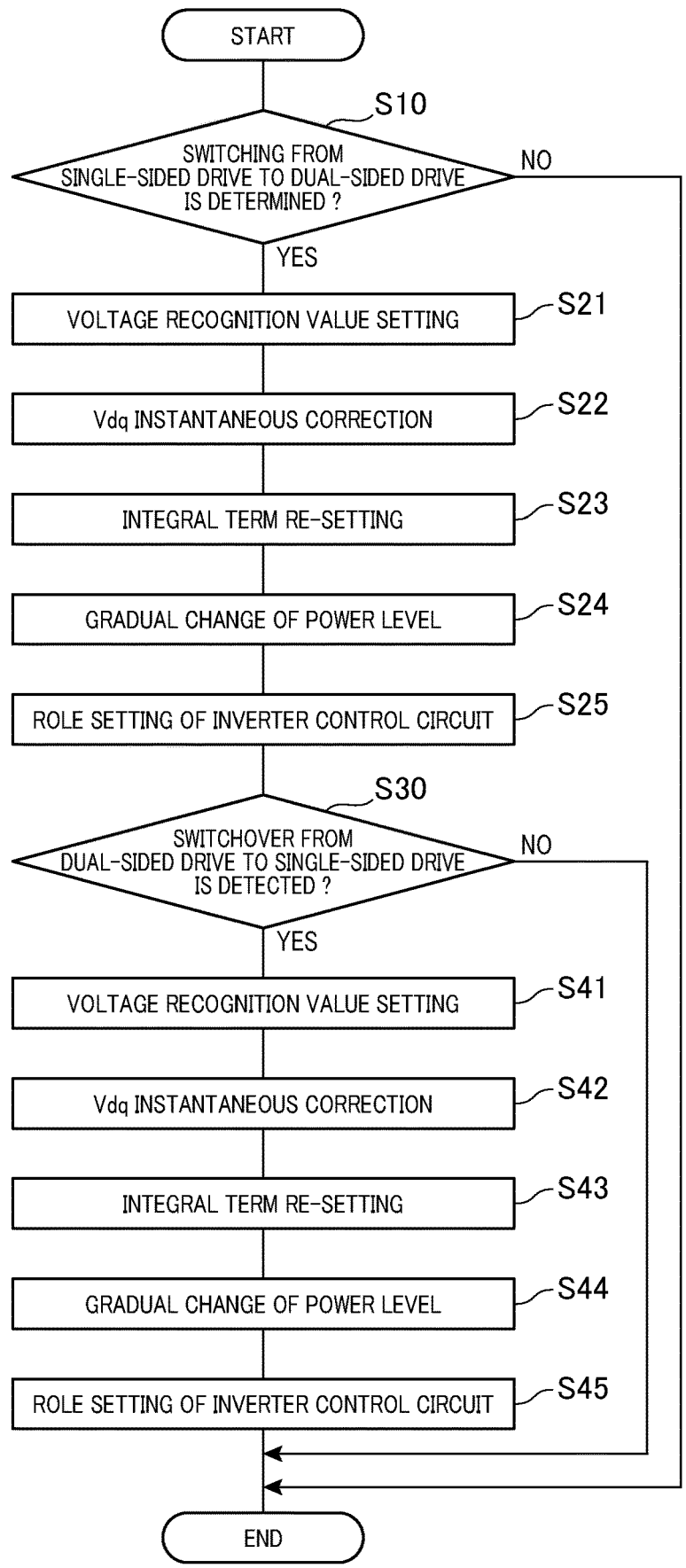
FIG. 16 is a flowchart of the drive mode switching process according to the third embodiment.

The drive mode switching process according to the third embodiment will be described with reference to the flowchart of FIG. 16. In FIG. 16, descriptions of the steps corresponding to the steps in FIG. 6 will be appropriately omitted. The determination of switchover from the single-sided drive mode to the dual-sided drive mode in step S10, and processes from the setting of the voltage recognition value to the gradual change in the power level in steps S21 to S24 are basically the same as those in FIG. 6.

For example, when the temperature Hb1 of the first power source 11 rises excessively, through the switching determination in step S10, the switching arbitrator 303 determine switchover to stop the first inverter 60 in one-side driving and alternatively start one-side driving of the inverter that has been stopped up to the present. Here, the phrase when the temperature rises excessively refers to a case in which the temperature exceeds the allowable upper limit that is higher than the appropriate upper limit in step S12 of FIG. 8. In such a case, it is preferable not only to reduce the load on the first power source 11 in the dual-sided drive mode but also to stop the first inverter 60 more actively. Note that it is preferable to carry out the same measure when the temperature Hinv1 of the first inverter 60 rises excessively.

Also, in a case where the SOC of the first power source 11 falls below the allowable lower limit that is lower than the appropriate lower limit in step S13 of FIG. 8, it is preferable that the switching arbitrator 303 stop the first inverter 60 by switching to the second inverter single-sided drive mode instead of staying in the dual-sided drive mode.

In step S25, the switching arbitrator 303 establishes settings to switch the roles of the two inverter control circuits 301 and 302 as a torque management circuit and a power management circuit. As described above, the torque management circuit performs feedback control. The power management circuit performs power distribution control on a feedforward control base, and manages the distribution of power supplied from the two power sources 11 and 12 to the two inverters 60 and 70.

The inverter control circuit that switches from feedback control to feedforward control inherits the value of the integral term as an initial value for power control, and thus starts the power control at this time point. The inverter control circuit that switches from feedforward control to feedback control substitutes the voltage command used for the power control into the integral term to transfer the voltage command to the feedback control, and starts the feedback control with the resulting value as the initial value.

In step S30, as in step S10, the switchover from the dual-sided drive mode to the single-sided drive mode is determined. When the switching determination holds and YES is determined in step S30, the respective processes from the setting of the voltage recognition value to the gradual change in the power level are performed in S41 to S44, as in S21 to S24. In S45, the roles of the two inverter control circuits 301 and 302 are set as in S25.

Figure 17:
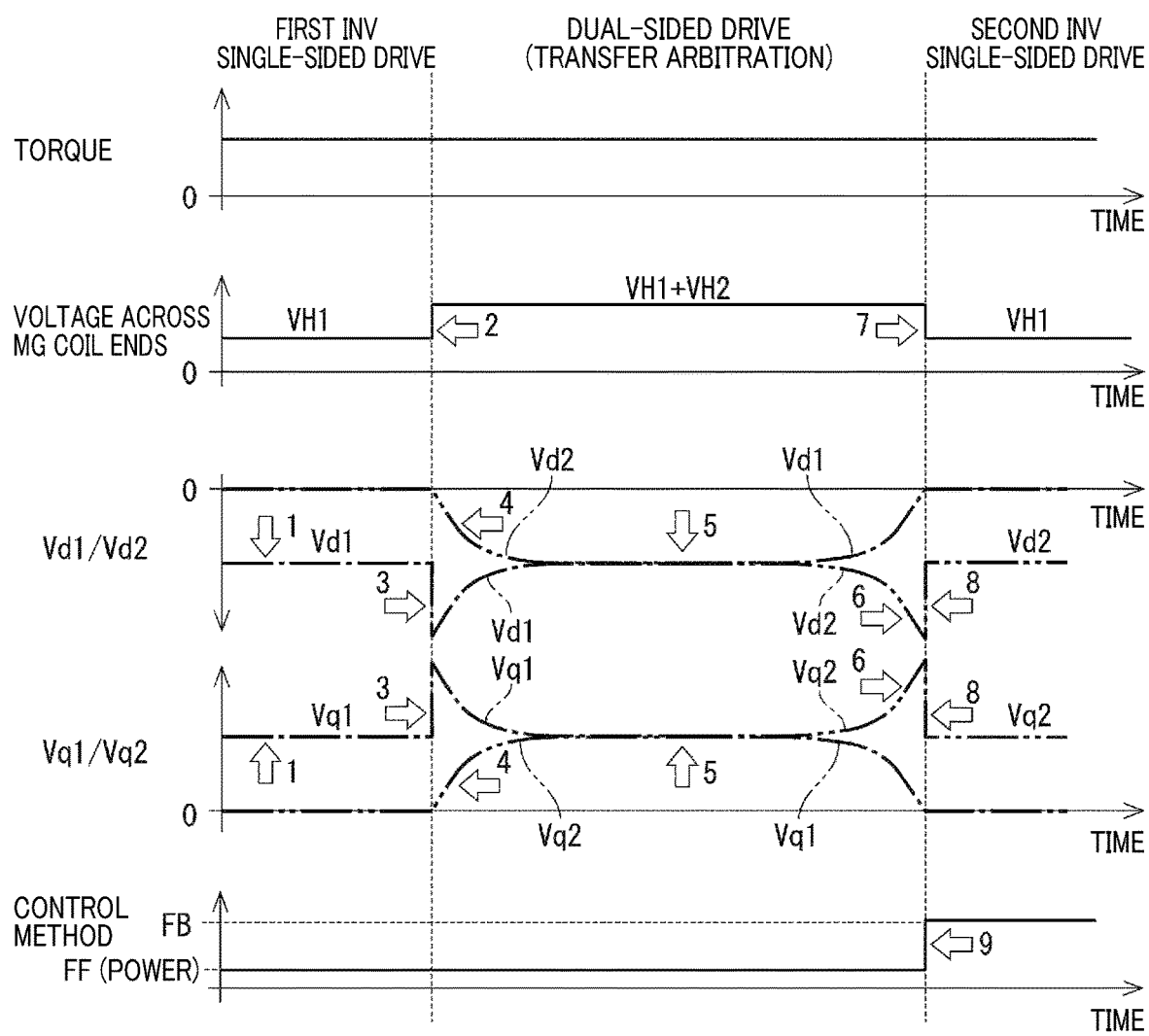
FIG. 17 is a time chart illustrating the switching operation according to the third embodiment when the voltages of two power sources are equal.

The time chart in FIG. 17 illustrates the operation of switching from the first inverter single-sided drive to the second inverter single-sided drive in the case where the voltages of the two power sources are equal (i.e., α=1), and the switching operation is explained in numerical order of the periods 1 to 9. At operation 1, the first inverter 60 performs single-sided drive. At operation 2, the power source voltage recognition value switches from VH1 to (VH1+VH2) based on the switching determination. At operation 3, the voltage command Vdq1 of the first inverter 60 is instantaneously corrected based on the power source voltage recognition value. At operation 4, the switching arbitrator 303 gradually changes and increases the output of the second inverter 70 from zero so that the first inverter 60 can respond.

At operation 5, the first inverter 60 and the second inverter 70 perform dual-sided drive. At operation 6, the switching arbitrator 303 gradually changes and increases the output of the second inverter 70 to 100% so that the first inverter 60 can respond. At operation 7, the power source voltage recognition value is switched from (VH1+VH2) to VH2 based on the switching determination.

At operation 8, a value obtained by multiplying the voltage command Vdq1 output from the first inverter 60 by a correction coefficient based on the voltage ratio α of the two power sources is transferred as the voltage command Vdq2 of the second inverter 70 through instantaneous correction based on the power source voltage recognition value. At operation 9, the control method of the second inverter control circuit 302 is switched from feed-forward control-based power control to a feedback control method.

Figure 18:
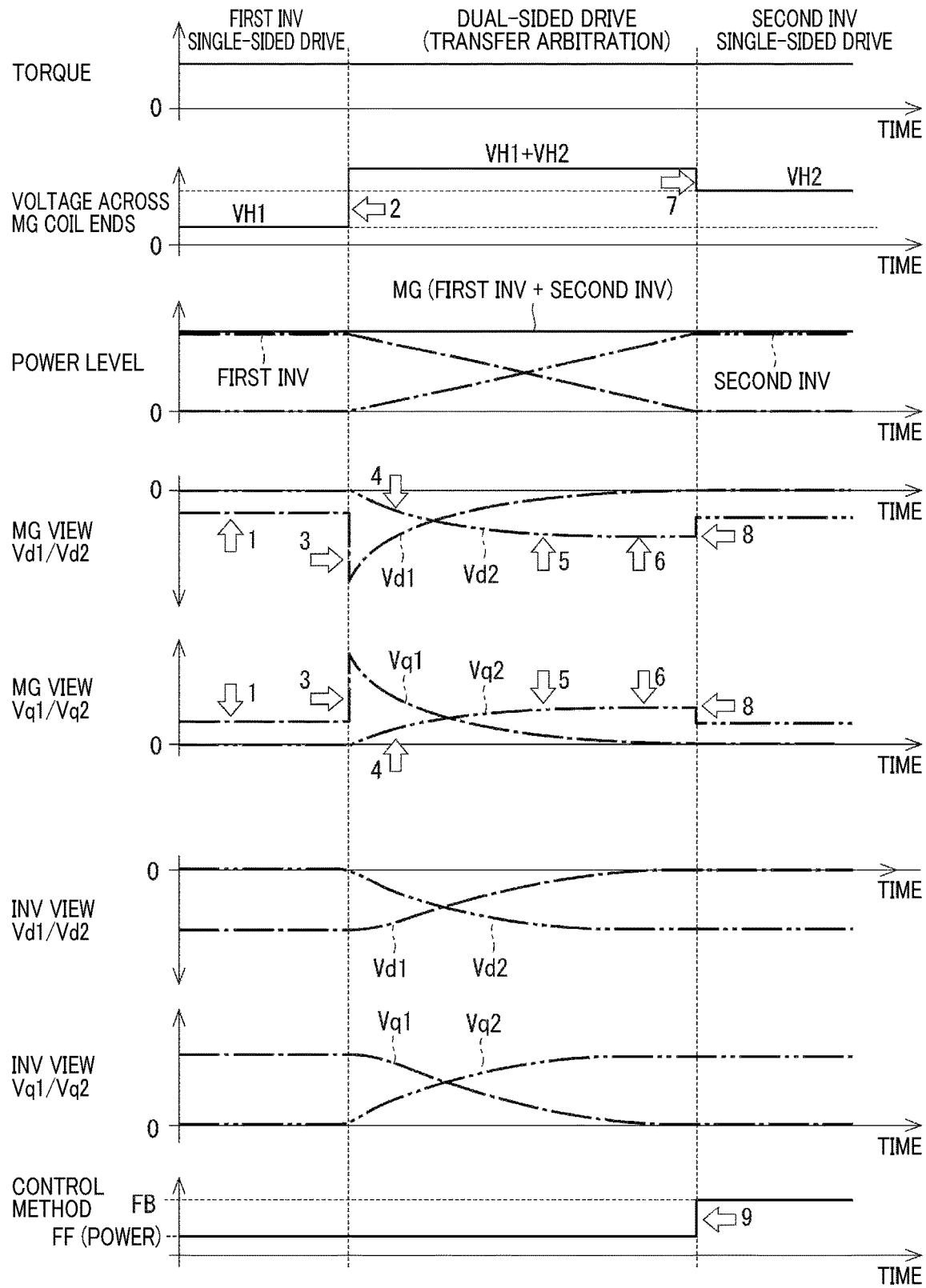
FIG. 18 is a time chart illustrating switching operation according to the third embodiment when the voltages of two power sources are different.

The time chart of FIG. 18 illustrates the operation of switching from the first inverter single-sided drive to the second inverter single-sided drive in the case where the voltages of the two power sources are different. In this example, the second power source voltage VH2 is higher than the first power source voltage VH1, and the voltage ratio α of the two power sources is greater than one. The power distribution ratio is 1:1. The numbered periods 1 to 9 of respective operations are in accordance with FIG. 17, and only the differences from FIG. 17 will be described.

At the time of switchover from the first inverter single-sided drive mode to the dual-sided drive mode of operation 2, the difference between the voltage recognition values before and after the switchover, VH1 and (VH1+VH2), is large. Therefore, the change of the voltage command Vdq1 due to the instantaneous correction of the operation 3 appears relatively large in the MG viewpoint. At the time of switchover from the dual-sided drive mode to the second inverter single-sided drive mode of operation 7, the difference between the voltage recognition values before and after the switchover, (VH1+VH2) and VH2, is small. Therefore, the change of the voltage command Vdq2 due to the instantaneous correction of the operation 8 appears relatively small in the MG viewpoint. At this time, the value multiplied by the correction coefficient based on the voltage ratio α of the two power sources is transferred as the voltage command Vdq2 of the second inverter 70.

In the third embodiment, as in the first embodiment, output fluctuation at the time of drive mode switching can be eliminated, and the SOC depletion of only one power source can be avoided when the single-sided drive mode with low load and low loss is continued.

At least one of the inverter control circuits operates as the power management circuit, and the switching arbitrator 303 switches the role of the power management circuit between the two inverter control circuits 301 and 302 and transfers the last control state to the other side at the time of drive mode switching. Consequently, the inverter control circuit that performs power distribution in the dual-sided drive mode is fixed, and the number of state transitions can be reduced to simplify the configuration.

Note that switching of the role of the power management circuit between the two inverter control circuits 301 and 302 is the same as in the first and second embodiments described above. That is, the roles of the torque management circuit and the power management circuit may be switched at the time of switchover from the first inverter single-sided drive mode to the dual-sided drive mode and the time of switchover from the dual-sided drive mode to the first inverter single-sided drive mode.

Fourth Embodiment

Figure 19:
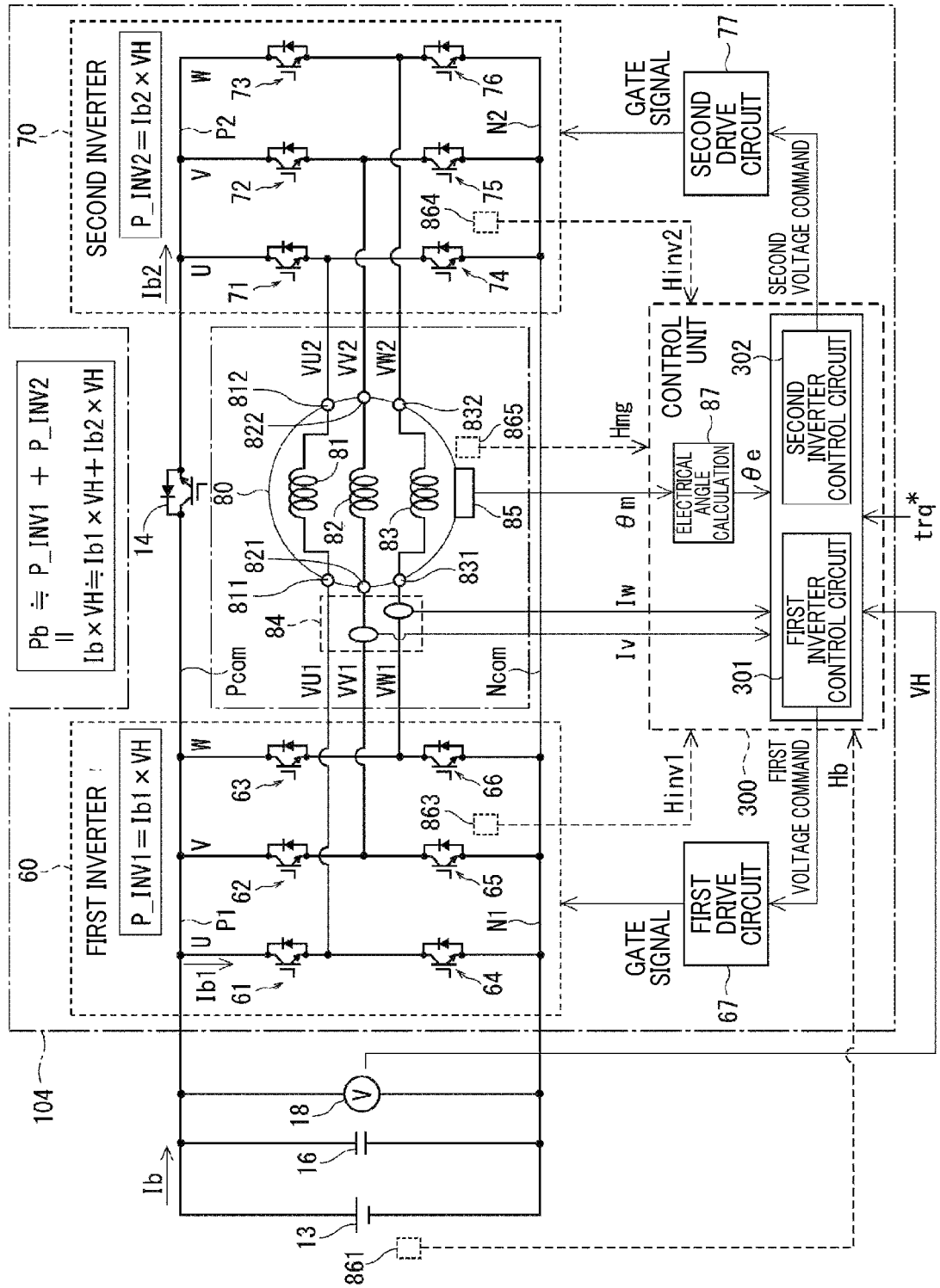
FIG. 19 is a diagram of the overall configuration of a system to which the electric motor drive device of a fourth embodiment is applied.

The fourth embodiment will now be described with reference to FIGS. 19 to 21. FIG. 19 illustrates the overall configuration of a system to which an MG control device 104 of the fourth embodiment is applied. In this system, the two inverters 60 and 70 are connected to one common power source 13. The reference signs of a capacitor 16, a voltage sensor 18, and a temperature sensor 861, which are so provided as to correspond to the common power source 13, are denoted by the reference signs of the respective components corresponding to the first power source 11 of the first embodiment. The voltage sensor 18 detects the voltage VH of the common power source 13, and the temperature sensor 861 detects the temperature Hb of the common power source 13. The current flowing through the common power source 13 is referred to as common power source current Ib. The power Pb of the common power source 13 is expressed by Pb=Ib×VH.

The high-potential-side wirings P1 and P2 of the first inverter 60 and the second inverter 70 are connected to each other through a common high-potential-side wiring Pcom, and the low-potential-side wirings N1 and N2 are connected to each other through a common low-potential-side wiring Ncom. A switch 14 capable of interrupting a current path is disposed in at least one of the common high-potential-side wiring Pcom and the common low-potential-side wiring Ncom. In the example of FIG. 19, the switch 14 is disposed in the common high-potential-side wiring Pcom.

As in FIG. 1 of the first embodiment, current Ib1 flows through the first inverter 60, and current Ib2 flows through the second inverter 70. However, in the fourth embodiment, the reference sign Ib1 does not denote the current of the first power source but the input current of the first inverter. Similarly, the reference sign Ib2 does not denote the current of the second power source but the input current of the second inverter.

The sum of the shared power P_INV1 of the first inverter 60 and the shared power P_INV2 of the second inverter 70 is substantially equal to the power Pb of the common power source 13, although there is a slight difference when the loss due to wiring or the like is taken into consideration. That is, Pb P_INV1+P_INV2. If current and voltage are used, Ib×VH≈Ib1×VH+Ib2×VH.

The configuration of the control unit 300 is basically the same as that of the first embodiment. However, while at least one of the inverter control circuits has a function of adjusting the level of power supplied from the two power sources 11 and 12 to the two inverters 60 and 70 in the first embodiment, the level of power supplied from the common power source 13 to the two inverters 60 and 70 is adjusted in the fourth embodiment. In such a case, the shared powers P_INV1 and P_INV2 are adjusted by adjusting the currents Ib1 and Ib2 input to the inverters 60 and 70.

In a star connection circuit configured by establishing neutral point coupling of one inverter, the MG control device 104 can operate the other inverter in the single-sided drive mode in an open (i.e., off) state of the switch 14. Moreover, in the dual-sided drive mode, the MG control device 104 can operate an H-bridge circuit including first switching elements 61 to 66 and second switching elements 71 to 76 of the phases in a closed (i.e., on) state of the switch 14. As described above, a technique of switching between the star connection circuit and the H-bridge circuit through operation of the switch 14 is disclosed in JP 2017-175747 A, etc.

Figure 20A:
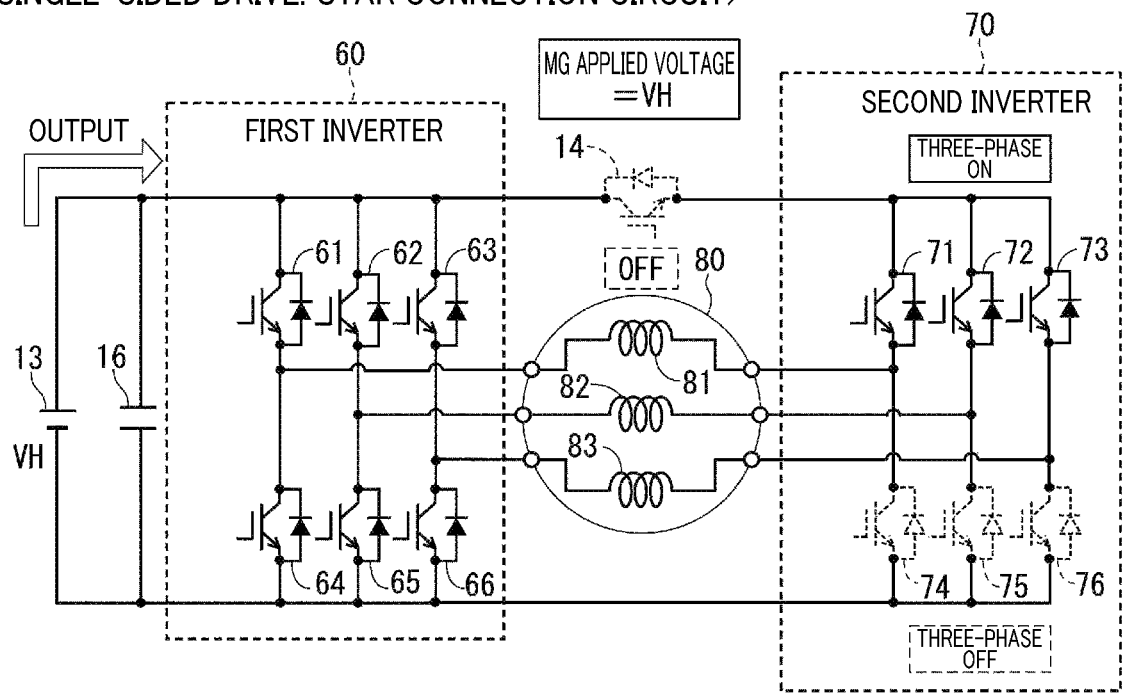
FIG. 20A is a diagram illustrating switching drive in a star connection circuit in a single-sided drive mode.

FIG. 20A illustrates switching drive in a star connection circuit in the single-sided drive mode. For example, by turning on one of upper-arm switching elements 71, 72, and 73 of all phases and lower-arm switching elements 74, 75, and 76 of all phases of the second inverter 70 and turning off the other, neutral point coupling is established, and a star connection circuit is formed by three-phase windings 81, 82, and 83. The first inverter 60 is then driven in the single-sided drive mode.

Figure 20B:
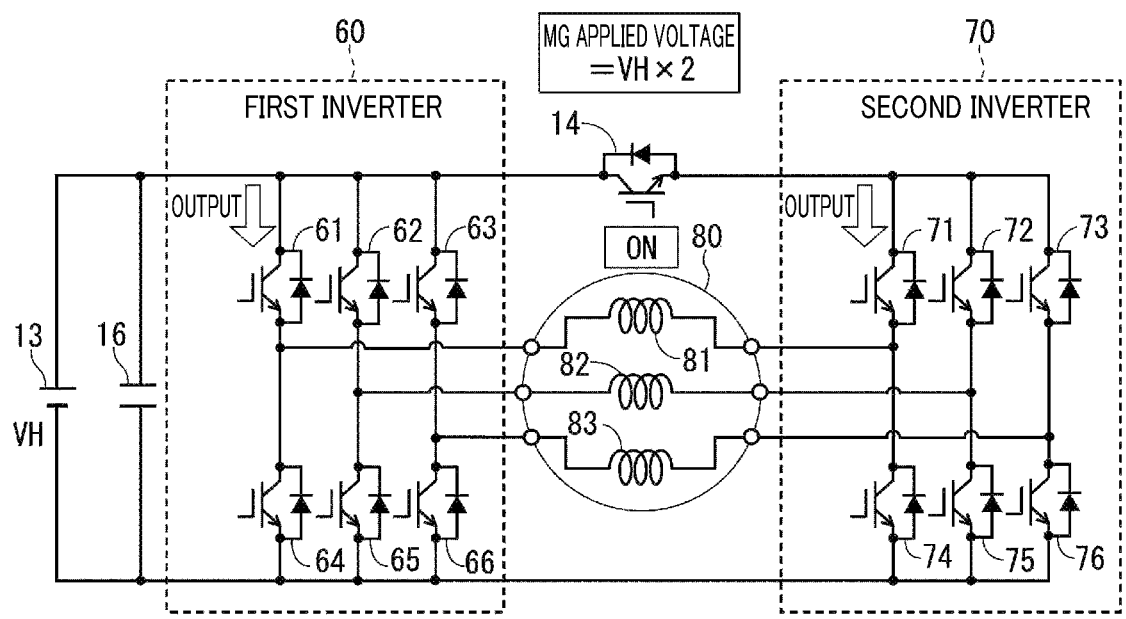
FIG. 20B is a diagram illustrating switching drive in an H-bridge circuit in a dual-sided drive mode.

FIG. 20B illustrates switching drive of the H-bridge circuit in the dual-sided drive mode. An H-bridge circuit is formed by the switching elements 61 and 64 of the first inverter 60 and the switching elements 71 and 74 of the second inverter 70 with respect to the U-phase open winding 81. An H-bridge circuit is formed by the switching elements 62 and 65 of the first inverter 60 and the switching elements 72 and 75 of the second inverter 70 with respect to the V-phase open winding 82. An H-bridge circuit is formed by the switching elements 63 and 66 of the first inverter 60 and the switching elements 73 and 76 of the second inverter 70 with respect to the W-phase open winding 83. By driving the H-bridge circuits of the respective phases in the dual-sided drive mode, a double value of the common power source voltage VH is applied to the MG80.

Figure 21:
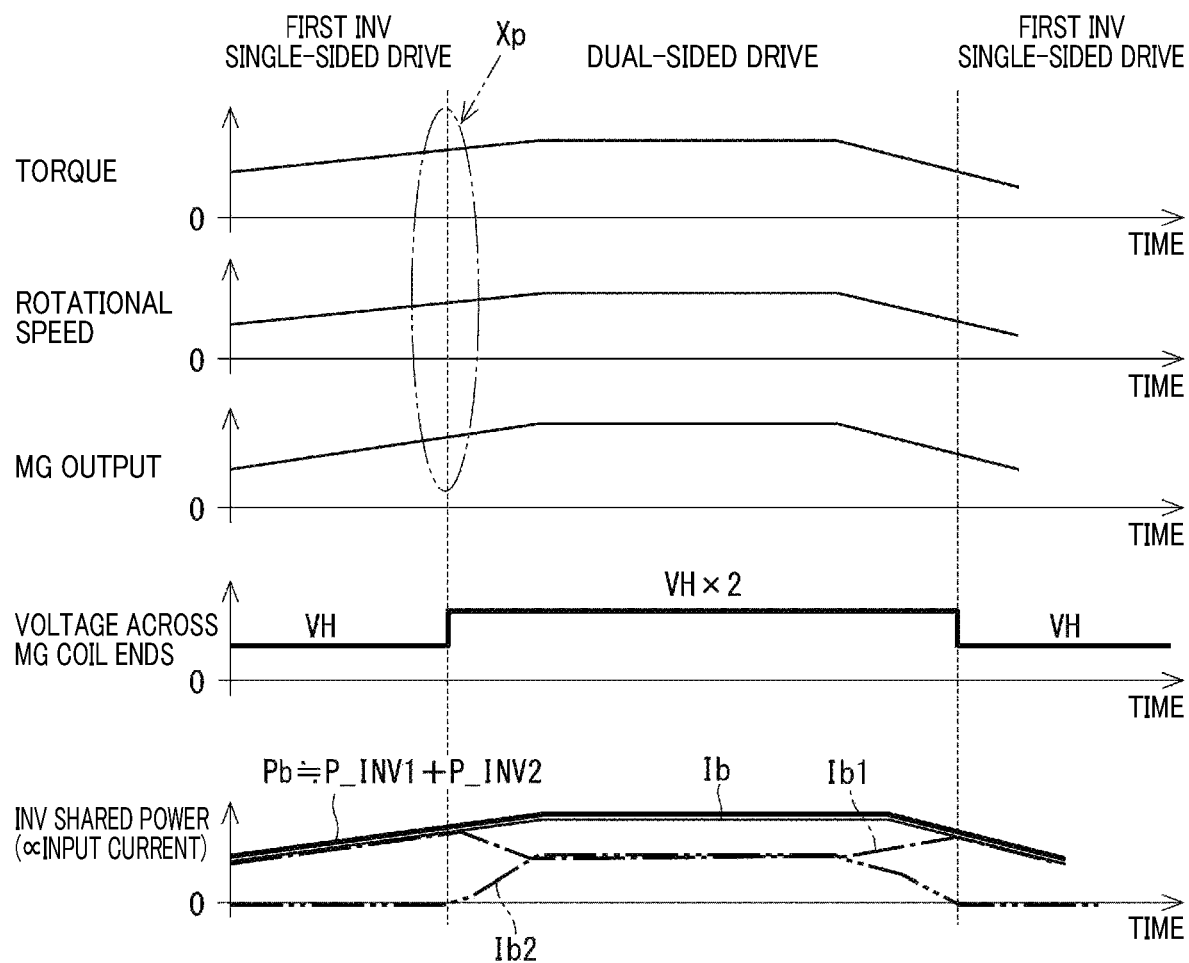
FIG. 21 is a time chart illustrating drive mode switching operation according to the fourth embodiment.

FIG. 21 is a time chart illustrating a drive mode switching operation according to the fourth embodiment. As in FIG. 10 of the first embodiment, the drive mode is switched from the first inverter single-sided drive mode to the dual-sided drive mode, and then switched from the dual-sided drive mode to the first inverter single-sided drive mode. The changes in the torque, the rotational speed, and the MG output of the MG 80 are the same as those in FIG. 10. For the amplitude of the MG coil end voltage, the first power source voltage VH1 of FIG. 10 is replaced by the common power source voltage VH, and the sum of the two-power source voltages (VH1+VH2) is replaced by a double value of the common power source voltage (VH×2).

With respect to the power source current in FIG. 10, in FIG. 21, the profile of change is the same, but a change in the inverter input current or the inverter shared power proportional to the input current is shown instead of that of the power source current. The sum of the two-power source voltages (Ib1+Ib2) of FIG. 10 is replaced by the common power source current Ib. The sum of the shared power of the two inverters 60 and 70 (P_INV1+P_INV2) changes in proportion to the change in the common power source current Ib. The instantaneous correction of the voltage commands Vdq1 and Vdq2 at the time of drive mode switching is the same as that of FIG. 10 and thus a description thereof will be omitted.

The MG control device 104 in this switching control determines the output of one inverter (e.g., the first inverter 60) based on the common power source voltage VH in the single-sided drive mode, and determines the output of the respective inverters 60 and 70 based on the double value of the common power source voltage (VH×2) in the dual-sided drive mode. At the time of drive mode switching, the switching arbitrator 303 instantaneously corrects the voltage commands Vdq1 and Vdq2 in response to sudden change in the voltage used for the determination of the output of the inverters, i.e., sudden change from VH to (VH×2) or from (VH×2) to VH, and transfers the voltage commands to the next processing cycle.

The slow change process according to the second embodiment may be combined with the above-described switching control according to the fourth embodiment. In such a case, the switching arbitrator 303 executes the slow change process in which the voltage recognition value for the control is slowly changed in response to sudden change in the voltage used for the determination of the output of the inverters at the time of drive mode switching.

As described above in the fourth embodiment, the single-sided drive mode of the star connection circuit and the dual-sided drive mode of the H-bridge circuit are switched in the system for driving the MG 80 including the open windings 81, 82, and 83 by using one common power source 13 and two inverters 60 and 70. Then, the output of the power P_INV1 and the power P_INV2 shared by the respective inverters 60 and 70 is arbitrated at the time of drive mode switching in accordance with the drive mode after the drive mode switching.

Consequently, one inverter can be stably stopped in the drive region of MG low output to reduce loss. When the thermal load of one inverter is high in the single-sided drive mode or the dual-sided drive mode, an inverter on one side can be stably stopped or shifted to the dual-sided drive mode to distribute the thermal load.

In addition, the switching arbitrator 303 of the fourth embodiment achieves the same effects as the effects (2) to (4) of the first embodiment. That is, at the time of the switchover from the single-sided drive mode to the dual-sided drive mode, the switching arbitrator 303 gradually changes and increases the level of power of the drive-start-side inverter from zero. At the time of switchover from the dual-sided drive mode to the single-sided drive mode, the switching arbitrator 303 gradually changes and decreases the power level of the drive-end-side inverter to zero. Consequently, changes in the output of the inverters can be mitigated at the rising edge and falling edge at the time of drive mode switching, and fluctuation in the torque of the motor caused by the influence of power fluctuation can be eliminated.

The switching arbitrator 303 performs switching determination in accordance with an output request to the MG 80, the SOC state of the common power source 13, or the temperature of the common power source 13, the inverters 60 and 70, or the MG 80. Consequently, it is possible to determine whether the drive mode can be switched in accordance with the drive state.

The switching arbitrator 303 determines the switching between the single-sided drive mode and the dual-sided drive mode based on the self-inverter voltage utilization factor VUF self calculated by dividing the inverter line voltage by the inverter input voltage for at least one inverter.

Consequently, a switching threshold can be set independently of the power source voltage difference, and the switching determination can be uniquely executed.

Furthermore, in the fourth embodiment, as in the above embodiments, at least one of the inverter control circuits operates as a power management circuit. In such a case, the switching arbitrator 303 can switch the role of the power management circuit between the two inverter control circuits 301 and 302 at the time of drive mode switching, and transfer the last control state to the other side.

Fifth Embodiment

Figure 22:
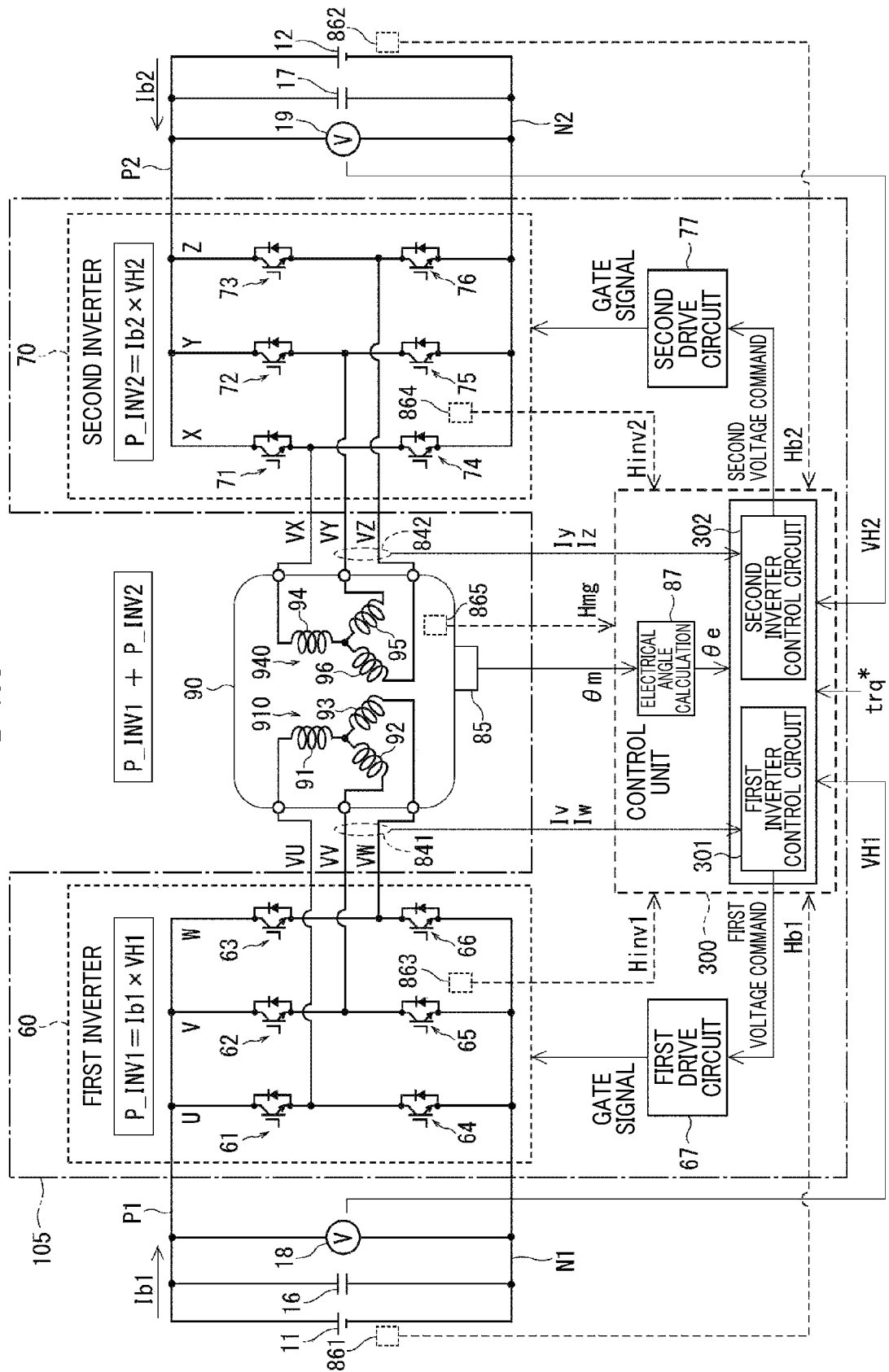
FIG. 22 is a diagram of the overall configuration of a system to which the electric motor drive device of a fifth embodiment is applied.

The fifth embodiment will now be described with reference to FIG. 22. FIG. 22 illustrates the overall configuration of a system to which an MG control device 105 of the fifth embodiment is applied. In such a system, as in the first embodiment illustrated in FIG. 1, the first inverter 60 is connected to the first power source 11, and the second inverter 70 is connected to the second power source 12. The meanings of the first power source current Ib1, the second power source current Ib2, the first source voltage VH1, and the second source voltage VH2 are interpreted in accordance with the first embodiment.

An MG 90 of the fifth embodiment is a six-phase dual winding motor including a first winding set 910 and a second winding set 940, each having three phases. In the first winding set 910, U-phase, V-phase, and W-phase windings 91, 92 and 93 are star-connected, and in the second winding set 940, X-phase, Y-phase, and Z-phase windings 94, 95 and 96 are star-connected.

The first inverter 60 includes multiple first switching elements 61 to 66 that receive DC power from the first power source 11 and are so disposed as to correspond to the phases of the first winding set 910, and is connected to the first winding set 910. A U-phase voltage VU, a V-phase voltage VV, and a W-phase voltage VW are applied from the first inverter 60 to the respective phase windings 91, 92, and 93 of the first winding set 910.

The second inverter 70 includes multiple second switching elements 71 to 76 that receive DC power from the second power source 12 and are so disposed to correspond to the phases of the second winding set 940, and is connected to the second winding set 940. An X-phase voltage VX, a Y-phase voltage VY, and a Z-phase voltage VZ are applied from the second inverter 70 to the respective phase windings 94, 95, and 96 of the second winding set 940.

In addition, the configuration of the control unit 300, the temperature sensor 861 to 865, etc., of the fifth embodiment is the same as that of the first embodiment. In the fifth embodiment, the drive mode switching control substantially the same as that according to the first to third embodiments can be applied, and similar effects can be achieved.

Sixth Embodiment

Figure 23:
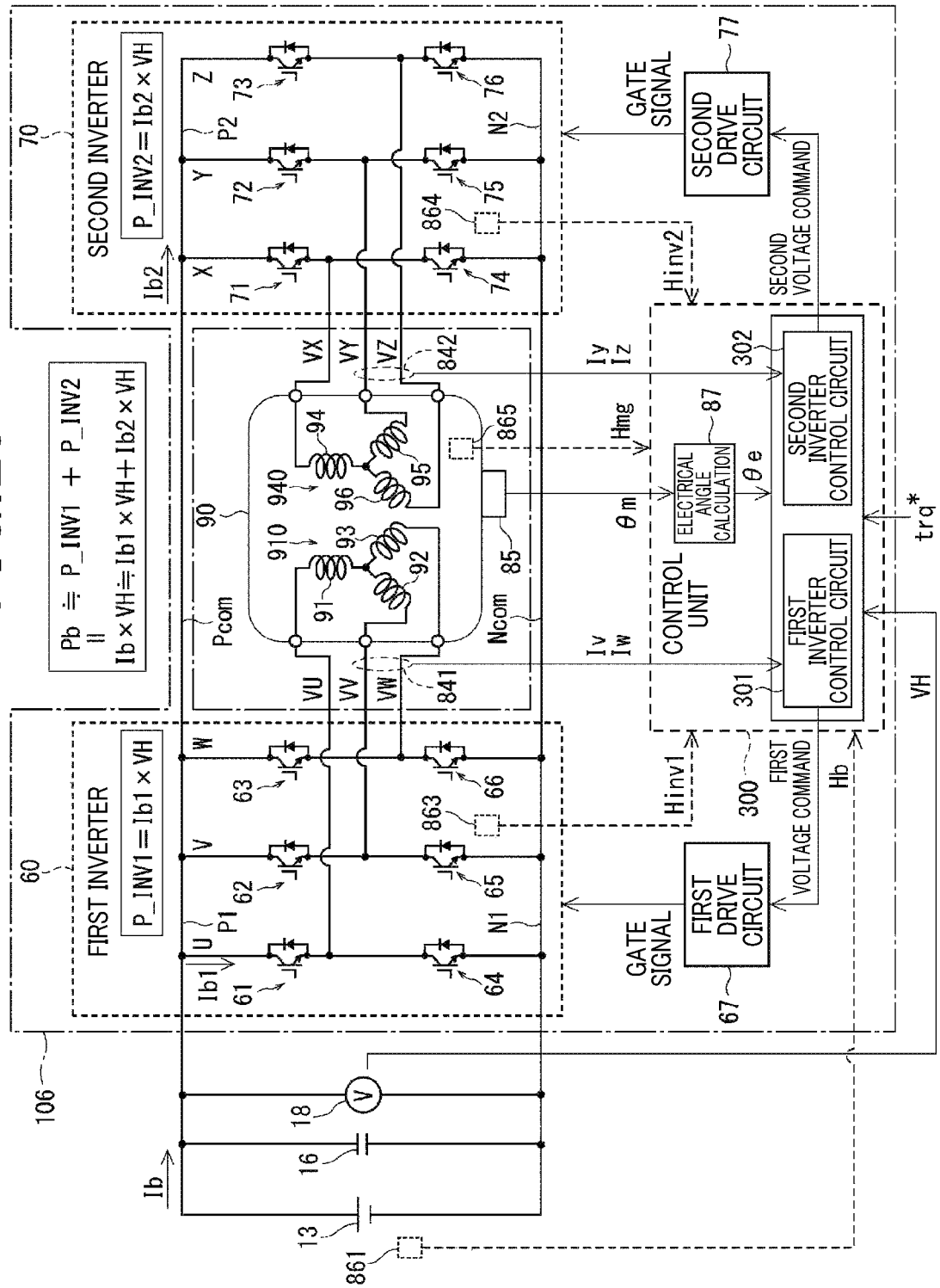
FIG. 23 is a diagram of the overall configuration of a system to which the electric motor drive device of a sixth embodiment is applied.

The sixth embodiment will now be described with reference to FIGS. 23 and 24. FIG. 23 illustrates the overall configuration of a system to which an MG control device 106 of the sixth embodiment is applied. In this system, the two inverters 60 and 70 are connected to the one common power source 13, as in the fourth embodiment illustrated in FIG. 19. The meanings of the first inverter input current Ib1, the second inverter input current Ib2, and the common power source voltage VH are interpreted in accordance with the fourth embodiment. The MG 90 of the sixth embodiment is a six-phase dual winding motor as in the fifth embodiment.

The high-potential-side wirings P1 and P2 of the first inverter 60 and the second inverter 70 are connected to each other through a common high-potential-side wiring Pcom, and the low-potential-side wirings N1 and N2 are connected to each other through a common low-potential-side wiring Ncom. The relationship between the power Pb of the common power source 13 and the shared power P_INV1 and P_INV2 of the inverters 60 and 70 is also expressed as Pb≈P_INV1+P_INV2 and Ib×VH≈Ib1×VH+Ib2×VH in accordance with the fourth embodiment. In the configuration of the control unit 300, as in the fourth embodiment, at least one inverter control circuit has a function of adjusting the level of the power supplied from the common power source 13 to the two inverters 60 and 70.

Figure 24:
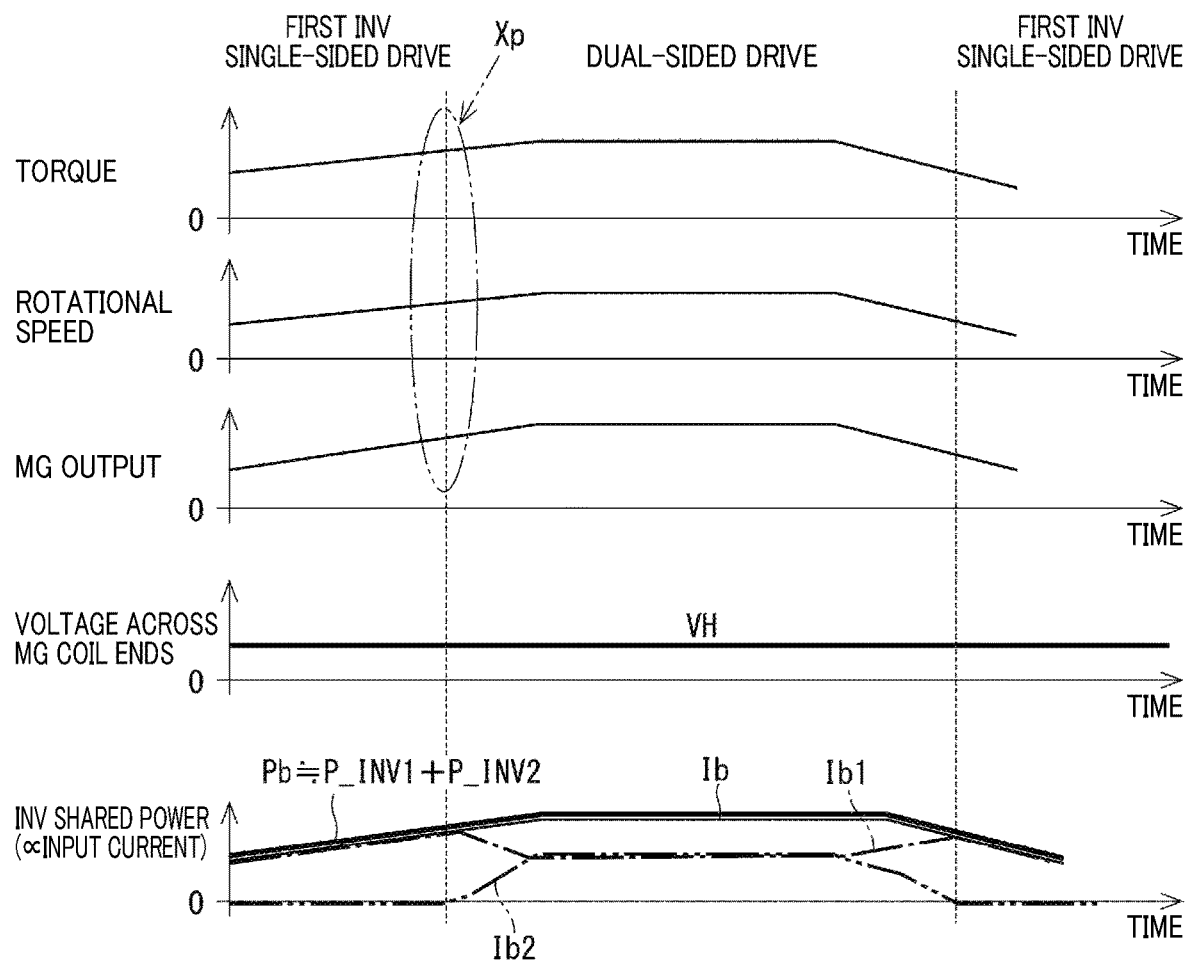
FIG. 24 is a time chart illustrating drive mode switching operation according to the sixth embodiment.

FIG. 24 is a time chart illustrating a drive mode switching operation according to the sixth embodiment. As in FIGS. 10 and 21 of the first and fourth embodiments, the drive mode is switched from the first inverter single-sided drive mode to the dual-sided drive mode, and then switched from the dual-sided drive mode to the first inverter single-sided drive mode. The change in the torque, the rotational speed, and the MG output of the MG 80 is the same as that of FIGS. 10 and 21, and the inverter input current or the inverter shared power proportional to the input current is the same as that of FIG. 21.

The amplitude of the voltage across the MG coil ends remains constant at the common power source voltage VH regardless of the switching between the single-sided drive mode and the dual-sided drive mode. Therefore, in the sixth embodiment, the voltages used for the determination of the output of the inverter do not suddenly change, and thus there is no need to consider the instantaneous correction of the voltage command or the gradual change process.

As described above in the sixth embodiment, the single-sided drive mode and the dual-sided drive mode are switched in the system for driving the MG 80 having six-phase dual windings by using the common power source 13 having one winding and the two inverters 60 and 70. Then, the output of the power P_INV1 and the power P_INV2 shared by the respective inverters 60 and 70 is arbitrated at the time of drive mode switching in accordance with the drive mode after the drive mode switching.

Consequently, in scenes in which low-loss operation is possible by stopping the inverter based on the element loss characteristics and the shared current level, an inverter on one side can be stably stopped or shifted to the dual-sided drive mode to reduce loss. When the thermal load of one inverter is high in the single-sided drive mode or the dual-sided drive mode, an inverter on one side can be stably stopped or shifted to the dual-sided drive mode to distribute the thermal load.

In addition, the switching arbitrator 303 of the sixth embodiment achieves the same effects as the effects (2) to (4) of the first embodiment. This point is the same as that described in the fourth embodiment. The role of the power management circuit is switched between the two inverter control circuits 301 and 302 in the same manner as in the above-described embodiments.

Other Embodiments (a) In the above-described embodiments, the drive mode switching is determined basically based on an MG output request and the power source state. In another embodiment, in addition to these factors, a fail-safe transition request based on detection of failure or signs of failure in the power sources 11 and 12 and the inverters 60 and 70 may be considered.

(b) In the system configuration of the first and fifth embodiments in which two independent power sources are used, either of the power sources is not limited to a secondary battery represented by a battery or a capacitor. For example, one power source may be a secondary battery, and the other power source may be a fuel cell or a generator.

(c) The number of phases of the open windings of the motor according to the first and fourth embodiments is not limited to three but may be four or more. Alternatively, two-phase open windings may be bridge-connected.

(d) The number of phases of the respective winding sets in the multi-phase dual motor according to the fifth and sixth embodiments is not limited to three phases but may be four or more. The configuration of each winding set is not limited to a star connection but may be a delta connection.

(e) The two-power, two-inverter type electric motor drive device is applicable to pure electric vehicles, such as electric vehicles and fuel cell vehicles, as well as electrically-rich hybrid power trains such as plug-in hybrid (PHV) and range extenders, and light electric vehicles, such as 12 to 48 V integrated starter generators (ISGs). This technology is based on voltage-type circuit topology that can be applied to uses that achieve high power output with high efficiency by serializing the power source voltages without using any voltage boost circuit with a reactor, which is a known conventional technology. This technology is suitable for applications in which high power output is required even in regions that are thermally difficult to achieve with conventional boost circuits and high-current type inverters in each vehicle, and enables more efficient operation than conventional powertrains.

The disclosure is not limited in any way to the above-described embodiments, and various modes can be implemented without departing from the scope thereof.

The control unit and methods described in the disclosure may be implemented by a dedicated computer provided by configuring a processor and a memory programmed to perform one or more functions embodied by a computer program. Alternatively, the control units and methods described in the disclosure may be implemented by a dedicated computer provided by configuring a processor with one or more dedicated hardware logic circuits. Alternatively, the control units and methods described in the disclosure may be implemented by one or more dedicated computers configured by a combination of a processor and a memory programmed to perform one or more functions and a processor configured by one or more hardware logic circuits. The computer program may also be stored in a computer-readable non-transitive tangible recording medium as instructions to be executed by a computer.

The disclosure is described in accordance with embodiments. However, the disclosure is not limited to such embodiments and structures. The disclosure also encompasses various variants and variations within the scope of equality. Various combinations and modes, as well as other combinations and modes including only one element, more or less, thereof, are also within the scope and idea of the disclosure.

What is claimed is:

1. An electric motor drive device that controls driving of a motor including open windings of two or more phases by using two inverters individually connected to two power sources, the open windings having end points that are open to each other, the electric motor drive device comprising:
 a first inverter that receives DC power from a first power source, includes a plurality of first switching elements so disposed as to correspond to the phases of the open windings, and is connected to one ends of the open windings;
 a second inverter that receives DC power from a second power source, includes a plurality of second switching elements so disposed as to correspond to the phases of the open windings, and is connected to other ends of the open windings; and
 a control unit comprising: two inverter control circuits of a first inverter control circuit that generates a first voltage command and a second inverter control circuit that generates a second voltage command, based on a torque command, the first voltage command being an output voltage command to the first inverter, the second voltage command being an output voltage command to the second inverter; and a switching arbitrator that determines switching between a single-sided drive mode and a dual-sided drive mode and arbitrates output of each of the inverters at a time of switching for making output of the motor continuous before and after the switching between the drive modes, the single-sided drive mode being a mode in which one of the two inverters performs switching drive, the dual-sided drive mode being a mode in which both the two inverters performs switching drive, wherein,
 at least one of the inverter control circuits has a function of adjusting a level of power supplied from the two power sources to the two inverters,
 the switching arbitrator,
 at switchover from the single-sided drive mode to the dual-sided drive mode, gradually changes and increases, from zero, the power level of the drive-start-side inverter starting the switching drive from a stopped state, and
 at switchover from the dual-sided drive mode to the single-sided drive mode, gradually changes and decreases, to zero, the power level of the drive-end-side inverter ending the switching drive and shifting to the stopped state.

2. An electric motor drive device that controls, by using two inverters individually connected to two power sources, driving of a motor including a first winding set and a second winding set of three or more phases connected by a star connection or a delta connection, the electric motor drive device comprising:
 a first inverter that receives DC power from a first power source, includes a plurality of first switching elements so disposed as to correspond to the phases of the first winding set, and is connected to the first winding set;
 a second inverter that receives DC power from a second power source, includes a plurality of second switching elements so disposed as to correspond to the phases of the second winding set, and is connected to the second winding set; and
 a control unit comprising: two inverter control circuits of a first inverter control circuit that generates a first voltage command and a second inverter control circuit that generates a second voltage command, based on a torque command, the first voltage command being an output voltage command to the first inverter, the second voltage command being an output voltage command to the second inverter; and a switching arbitrator that determines switching between a single-sided drive mode and a dual-sided drive mode and arbitrates output of each of the inverters at a time of switching for making output of the motor continuous before and after the switching between the drive modes, the single-sided drive mode being a mode in which one of the two inverters performs switching drive, the dual-sided drive mode being a mode in which both the two inverters performs switching drive, wherein,
 at least one of the inverter control circuits has a function of adjusting a level of power supplied from the two power sources to the two inverters,
 the switching arbitrator,
 at switchover from the single-sided drive mode to the dual-sided drive mode, gradually changes and increases, from zero, the power level of the drive-start-side inverter starting the switching drive from a stopped state, and
 at switchover from the dual-sided drive mode to the single-sided drive mode, gradually changes and decreases, to zero, the power level of the drive-end-side inverter ending the switching drive and shifting to the stopped state.

3. The electric motor drive device according to claim 1, wherein
 the switching arbitrator determines the switching between the single-sided drive mode and the dual-sided drive mode based on at least one of an output request to the motor, an SOC state of the power sources, or a temperature of the power sources, the inverters, or the motor.

4. The electric motor drive device according to claim 1, wherein
 the switching arbitrator determines the switching between the single-sided drive mode and the dual-sided drive mode based on a self-inverter voltage utilization factor calculated by dividing inverter line voltage by inverter input voltage for at least one of the inverters.

5. The electric motor drive device according to claim 1, wherein,
 at least one of the inverter control circuits operates as a power management circuit that manages distribution of power supplied from the two power sources to the two inverters, and
 at the time of switching of the drive mode, the switching arbitrator switches a role of the power management circuit between the two inverter control circuits and transfers the last control state to the other side.

6. The electric motor drive device according to claim 1, wherein,
 in a control configuration in which output of the inverters is determined based on voltage of one of the power sources in the single-sided drive mode, and output of the inverters is determined based on a voltage sum of the two power sources in the dual-sided drive mode,
 the switching arbitrator instantaneously corrects a voltage command in response to sudden change in the voltage sum of the two power sources at the time of switching of the drive mode, and transfers the voltage command to the next processing cycle.

7. The electric motor drive device according to claim 1, wherein,
in a control configuration in which output of the inverters is determined based on voltage of one of the power sources in the single-sided drive mode, and output of the inverters is determined based on a voltage sum of the two power sources in the dual-sided drive mode,
the switching arbitrator executes a slow change process for slowly changing a voltage recognition value on the control with respect to the sudden change in the sum of the two-power source voltages at the time of switching of the drive mode.

8. The electric motor drive device according to claim 1, wherein,
in a case of switchover from the single-sided drive mode by one of the inverters as the drive-end-side inverter to the single-sided drive mode by the other inverter as the drive-start-side inverter, the drive mode is switched through the dual-sided drive mode, and
the switching arbitrator gradually decreases output of the drive-end-side inverter from 100% to 0% and gradually increases output of the drive-start-side inverter from 0% to 100% in the dual-sided drive mode.

9. The electric motor drive device according to claim 1, wherein,
in a case of switchover from the single-sided drive mode by one of the inverters as the drive-end-side inverter to the single-sided drive mode by the other inverter as the drive-start-side inverter, the drive mode is switched through the dual-sided drive mode, and
the switching arbitrator transfers a value obtained by multiplying the voltage command output from the drive-end-side inverter by a correction coefficient based on a voltage ratio of the two power sources as a voltage command of the drive-start-side inverter.

10. An electric motor drive device that controls driving of a motor including open windings of two or more phases by using two inverters connected to a common power source, the open windings having end points open to each other, the electric motor device comprising:
a first inverter that includes a plurality of first switching elements so disposed as to correspond to the phases of the open windings, and is connected to one ends of the open windings;
a second inverter that includes a plurality of second switching elements so disposed as to correspond to the phases of the open windings, and is connected to other ends of the open windings;
a common high-potential-side wiring that connects high-potential-side wirings of the first inverter and the second inverter;
a common low-potential-side wiring that connects low-potential-side wirings of the first inverter and the second inverter;
a switch that is disposed in at least one of the common high-potential-side wiring and the common low-potential-side wiring and is capable of interrupting a current path; and
a control unit comprising: two inverter control circuits of a first inverter control circuit that generates a first voltage command and a second inverter control circuit that generates a second voltage command, based on a torque command, the first voltage command being an output voltage command to the first inverter, the second voltage command being an output voltage command to the second inverter; and a switching arbitrator that determines switching between a single-sided drive mode and a dual-sided drive mode and arbitrates output of each of the inverters at a time of switching for making output of the motor continuous before and after the switching between the drive modes, the single-sided drive mode being a mode in which one of the two inverters performs switching drive, the dual-sided drive mode being a mode in which both the two inverters performs switching drive, wherein,
in a star connection circuit configured by one inverter establishing neutral point coupling, the other inverter is operable in the single-sided drive mode in an open state of the switch,
in an H-bridge circuit configured by the corresponding first switching elements and the corresponding second switching elements of the respective phases, operation in the dual-sided drive mode is performed in s closed state of the switch,
at least one of the inverter control circuits has a function of adjusting a level of power supplied from the common power source to the two inverters,
the switching arbitrator,
at switchover from the single-sided drive mode to the dual-sided drive mode, gradually changes and increases, from zero, the power level of the drive-start-side inverter starting the switching drive from a stopped state, and
at switchover from the dual-sided drive mode to the single-sided drive mode, gradually changes and decreases, to zero, the power level of the drive-end-side inverter ending the switching drive and shifting to the stopped state.

11. The electric motor drive device according to claim 10, wherein,
in a control configuration in which output of the inverters is determined based on voltage of the common power source in the single-sided drive mode, and output of the inverters is determined based on a double value of voltage of the common power source in the dual-sided drive mode,
the switching arbitrator instantaneously corrects a voltage command in response to sudden change in the voltage used for determining the output of the inverters at the time of switching of the drive mode, and transfers the voltage command to the next processing cycle.

12. The electric motor drive device according to claim 10, wherein,
in a control configuration in which output of the inverters is determined based on voltage of the common power source in the single-sided drive mode, and output of the inverters is determined based on a double value of voltage of the common power source in the dual-sided drive mode,
the switching arbitrator executes a slow change process for slowly changing a voltage recognition value on the control with respect to the sudden change in the voltage used to determine the output of the inverters at the time of switching of the drive mode.

13. An electric motor drive device that controls, by using two inverters connected to a common power source, driving of a motor including a first winding set and a second winding set of three or more phases connected by a star connection or a delta connection, the electric motor drive device comprising:
a first inverter that includes a plurality of first switching elements so disposed as to correspond to the phases of the first winding set, and is connected to the first winding set;

a second inverter that includes a plurality of second switching elements so disposed as to correspond to the phases of the second winding set, and is connected to the second winding set;

a common high-potential-side wiring that connects high-potential-side wirings of the first inverter and the second inverter;

a common low-potential-side wiring that connects low-potential-side wirings of the first inverter and the second inverter;

a control unit comprising: two inverter control circuits of a first inverter control circuit that generates a first voltage command and a second inverter control circuit that generates a second voltage command, based on a torque command, the first voltage command being an output voltage command to the first inverter, the second voltage command being an output voltage command to the second inverter; and a switching arbitrator that determines switching between a single-sided drive mode and a dual-sided drive mode and arbitrates output of each of the inverters at a time of switching for making output of the motor continuous before and after the switching between the drive modes, the single-sided drive mode being a mode in which one of the two inverters performs switching drive, the dual-sided drive mode being a mode in which both the two inverters performs switching drive, wherein, at least one of the inverter control circuits has a function of adjusting a level of power supplied from the common power source to the two inverters, the switching arbitrator, at switchover from the single-sided drive mode to the dual-sided drive mode, gradually changes and increases, from zero, the power level of the drive-start-side inverter starting the switching drive from a stopped state, and at switchover from the dual-sided drive mode to the single-sided drive mode, gradually changes and decreases, to zero, the power level of the drive-end-side inverter ending the switching drive and shifting to the stopped state.

14. The electric motor drive device according to claim 10, wherein the switching arbitrator determines the switching between the single-sided drive mode and the dual-sided drive mode based on at least one of an output request to the motor, an SOC state of the common power source, or a temperature of the common power source, the inverters, or the motor.

15. The electric motor drive device according to claim 10, wherein the switching arbitrator determines the switching between the single-sided drive mode and the dual-sided drive mode based on a self-inverter voltage utilization factor calculated by dividing inverter line voltage by inverter input voltage for at least one of the inverters.

16. The electric motor drive device according to claim 10, wherein at least one of the inverter control circuits operates as a power management circuit that manages distribution of power supplied from the common power source to the two inverters, and at the time of switching the drive mode, the switching arbitrator switches a role of the power management circuit between the two inverter control circuits and transfers the last control state to the other side.

17. The electric motor drive device according to claim 10, wherein in a case of switchover from the single-sided drive mode by one of the inverters as the drive-end-side inverter to the single-sided drive mode by the other inverter as the drive-start-side inverter, the drive mode is switched through the dual-sided drive mode, and the switching arbitrator gradually decreases output of the drive-end-side inverter from 100% to 0% and gradually increases output of the drive-start-side inverter from 0% to 100% in the dual-sided drive mode.

\* \* \* \* \*